(12) United States Patent
Albrecht et al.

(10) Patent No.: US 7,518,823 B2
(45) Date of Patent: Apr. 14, 2009

(54) SPINDLE MOTOR WINDING FOR MINIATURE HARD DISK DRIVE

(75) Inventors: David W. Albrecht, San Jose, CA (US); Taeyong Yoon, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 589 days.

(21) Appl. No.: 11/149,011

(22) Filed: Jun. 9, 2005

(65) Prior Publication Data

US 2006/0279876 A1    Dec. 14, 2006

(51) Int. Cl.
    G11B 17/02    (2006.01)
    H02K 7/08    (2006.01)

(52) U.S. Cl. .................... 360/99.08; 310/67 R
(58) Field of Classification Search .......... 360/99.04, 360/99.08; 310/67 R
    See application file for complete search history.

(56) References Cited

U.S. PATENT DOCUMENTS

| | | | |
|---|---|---|---|
| 5,157,295 A * | 10/1992 | Stefansky et al. ........ | 310/90 |
| 5,233,253 A | 8/1993 | Nishio et al. | |
| 5,291,357 A | 3/1994 | Uda | |
| 5,296,981 A | 3/1994 | Ogawa | |
| 5,319,270 A | 6/1994 | Tanaka et al. | |
| 5,392,176 A * | 2/1995 | Anderson ............... | 360/97.01 |
| 5,528,436 A | 6/1996 | Peter | |
| 5,675,452 A * | 10/1997 | Nigam ................... | 360/97.02 |
| 5,760,504 A * | 6/1998 | Moser .................... | 310/67 R |
| 5,877,916 A | 3/1999 | Papst | |
| 5,949,613 A | 9/1999 | Moir et al. | |
| 6,005,746 A | 12/1999 | Papst | |
| 6,144,126 A | 11/2000 | Kodama | |
| 6,191,913 B1 * | 2/2001 | Nicklos ................. | 360/99.04 |
| 6,201,322 B1 | 3/2001 | Heine et al. | |
| 6,271,988 B1 | 8/2001 | Papst | |
| 6,282,053 B1 | 8/2001 | MacLeod et al. | |
| 6,300,695 B1 | 10/2001 | Neal | |
| 6,344,946 B1 | 2/2002 | Papst | |
| 6,728,063 B1 | 4/2004 | Gustafson et al. | |
| 6,759,784 B1 | 7/2004 | Gustafson et al. | |
| 2004/0016617 A1 * | 1/2004 | Imai et al. ............. | 192/84.961 |
| 2005/0194855 A1 * | 9/2005 | Hasebe et al. ......... | 310/156.43 |
| 2006/0279876 A1 * | 12/2006 | Albrecht et al. ........ | 360/99.08 |

FOREIGN PATENT DOCUMENTS

| | | |
|---|---|---|
| JP | 6176477 | 6/1994 |
| JP | 6290536 | 10/1994 |
| JP | 11110896 | 4/1999 |
| JP | 2001076417 | 3/2001 |

* cited by examiner

*Primary Examiner*—Brian E Miller

(57) ABSTRACT

A spindle motor for implementation in a low profile hard disk drive is described; that spindle motor having a novel configuration for the torque generating portion. The spindle motor includes a hub coupled with a disk platter; that has a rotational axis about a suitable bearing system. A stator portion of material for conducting magnetic flux from the rotor poles, and having twelve stems and a plurality of windings, is configured to be disposed beneath the disk platter and coupled to the drive base. A rotor portion coupled with the hub having back iron ring with a permanent sixteen pole magnet radially polarized is closely radially disposed to the stator. The number of poles of the rotor portion has a defined proportion relative to the number of stems of the stator portion. The windings provide conductivity for creating an electromagnetic force applicable at the torque radius for rotation of the hub.

12 Claims, 19 Drawing Sheets

SPINDLE MOTOR WINDING FOR MINIATURE HARD DISK DRIVE

FIELD OF THE INVENTION

The present invention relates to hard disk drives. More particularly, the present invention provides an improved spindle motor winding for a low profile hard disk drive having a diminutive form factor.

BACKGROUND OF THE INVENTION

Hard disk drives are used in almost all computer system operations, and recently even in consumer electronic devices such as digital cameras, video recorders, and audio (MP3) players. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago. The hard drive model includes a plurality of storage disks or hard disks vertically aligned about a central core that can spin at a wide range of standard rotational speeds depending on the computing application in which the hard disk drive is being used. A plurality of magnetic read/write transducer heads, where a head reads data from and writes data to a surface of a disk, are mounted on actuator arms.

Data is formatted as written magnetic transitions (information bits) on data tracks evenly spaced at known intervals across the disk. An actuator arm is utilized to reach out over the disk to or from a location on the disk where information is stored. The complete assembly at the extreme of the actuator arm, e.g., the suspension and magnetic read/write transducer head, is known as a head gimbal assembly (HGA).

In operation, the hard disks are rotated at a set speed via a spindle motor assembly having a central drive hub. When a request for a read of a specific portion or track is received, the hard disk drive aligns a head, via the actuator arm, over the specific track location and the head reads the information from the disk. In the same manner, when a request for a write of a specific portion or track is received, the hard disk drive aligns a head, via the actuator arm, over the specific track location and the head writes the information to the disk.

Over the years, refinements of the magnetic recording technology for the disk and head have provided the capability to increase, by many orders of magnitude, the amount of magnetic data information that can be recorded per unit of disk surface area. This in turn has led to substantial reductions in the size of the hard disk drive. For example, an original hard disk drive had many disks, each of which had a diameter of 24 inches. The disk platter diameter has, over time, evolved downward to 356 millimeters, 200 millimeters, 130 millimeters, and 95 millimeters. Present day hard disk drives have fewer disks, are generally much smaller, and the disks may have a diameter of 95 millimeters, 65 millimeters, 48 millimeters, or smaller. Recently developed miniature hard disk drives (MHDD) have disk diameters of 27.4 millimeters or smaller.

An additional refinement to the hard disk drive, resulting from the reduction in disk diameter size and the corresponding reduction in air drag or power associated with rotation of the disk platter, is the increased efficiency and reduced size of the spindle motor spinning the disk. When the diameter of the disk became smaller than 200 millimeters, it became common design practice to rotate the spindle, for those size disks, with a brushless DC motor directly coupled to the central drive hub, with the motor packaged within the hub.

Prior art FIGS. 5D and 5E are side elevation views of two such spindle motors, and those skilled in the art readily comprehend how there is sufficient radial space within the disk platter hole to package the central drive hub, stator components, rotor components, and bearing components to enable rotation of the assembly about that bearing system. Prior art FIGS. 5D and 5E illustrate some of the components of a spindle motor disposed in the platter hole and which can include, but which are not limited to, a shaft 37, a bearing 37b, a back iron 31, a radially poled magnet rotor component 32, a coil 24 wound around a stator stem 22 and a screw 95 and a clamp 96 for retaining a magnetic disk(s) 15.

As technology has reduced disk size and power draw for small motors, the mechanical portion of the hard disk drive can be reduced and additional revolutions per minute (RPM) of the spindle can be achieved. For example, it is not uncommon for a hard disk drive disk having a diameter of 65 millimeters to reach speeds of 15,000 RPM. Increased rates of revolution provide a faster read and write rate for the disk and decrease latency, the time required for a data area to become located beneath a head, thereby increasing data access speed. The increase in data access speed due to the increased RPM of the disk drive, and the more efficient read/write head portion, provide modern computers with data access performance and storage capabilities that are continually increasing for those applications that require performance. In other applications such as mobile laptop computers, the hard disk drive, which typically now has only one or two 65 millimeter disks, is rotated at a much lower range of RPMs (e.g., from approximately 4200 to approximately 7200 RPMs), and efficient storage and transfer of data is effected at power levels consistent with use of a battery for the computer power source.

Particularly, with regard to the continued miniaturization of the hard disk drive, smaller diameter disk platters having a hole of limited size has led to the development of diminutively sized spindle motors. These miniature hard disk drives (MHDD) typically have only one disk platter and a very low profile height of approximately 5.0 millimeters. MHDDs having low form factor height have limited cylindrical volume (diameter times height) for packaging the spindle motor stator and rotor, but still require a high spindle motor torque constant for high start torque, low run current, and therefore low operational power requirements.

Minimizing necessary operational power is a key attribute required in MHDDs and particularly beneficial for mobile applications. In MHDDs, the entire form factor height of the MHDD is effectively utilized by the spindle motor package. Further, because of height constraints, the card/printed circuit board (PCB) for the MHDD electronics requires one or more openings therein to accommodate the spindle motor and related packaging. In MHDDs, this/these hole(s) can occupy a substantial portion of the card (PCB) such that there can be insufficient space to locate the necessary electronic components, especially if one of those components is a large area highly integrated electronics package.

FIG. 5A (prior art) is an illustration of a conventional low profile hard disk drive 10 currently available, shown with the spindle bearing and hub removed, and only the outside perimeter of the disk defined. A side elevation of the spindle of drive 10 of FIG. 5A is shown in FIG. 5C. Drive 10 includes one or more hard disks 15 from which data is read or to which data is written. Drive 10 includes, in part, an actuator arm 4 having coupled thereto a read/write head for reading from and writing to disk 15. Also shown in drive 10 is a typical spindle motor 20 having a stator/coil unit 21 and a rotor unit 30 with radially poled permanent magnets that work in cooperation to create an electromagnetic force at the torque radius to rotate the spindle and disk. As the stator/coil unit and its rotor are disposed beneath a portion of the disk surface area that the actuator and HGA with the read/write transducer head must traverse (as indicated by arrow 36), there is a severe height constraint in this region for the allowable height of these torque generating motor components.

Hard disk 15 of drive 10 typically has a radius R1 of approximately 13.7 millimeters and an inside hole diameter of approximately 7.0 millimeters. Spindle motor 20 typically has a stator/coil unit 21 having nine slots (nine stems) and a permanent magnet rotor 30 with twelve poles. Typically, spindle motor 20 generates a maximum constant torque output of less than 2.9 Newton millimeters per ampere, that value being a threshold desired for 3.3 volt power supplies, given the drag load associated with this size spindle bearing and disk diameter.

FIG. 5B (prior art) is an illustration of the stator/coil unit 21 and permanent magnet rotor 30 of a typical spindle motor 20 shown removed from drive 10 of FIG. 5A. Spindle motor 20, in the shown configuration, has a stator with an outer diameter OD1 of approximately 17.5 millimeters and an inside diameter ID1 of approximately 9.7 millimeters. Spindle motor 20 includes an inner rotor unit 30 having a back iron member 31 and a radially polarized permanent magnet 32 consisting of twelve poles. Spindle motor 20 further includes an outer stator/coil unit 21 having nine stator stems 22, and around each stator stem 22 is a coil winding 24. Further, each stem 22 of stator unit 21 terminates at the tip 28 in a geometric shape termed a tooth or pole tip shoe that is configured to be proximal to the outer edge of the magnetic poles of rotor 30 to efficiently capture the magnetic flux therefrom. Stator unit 21 is shown to have a three phase coil winding, e.g., phases 40, 50 and 60. Each phase 40, 50, and 60, has associated therewith three stems 22, e.g., stems 41, 42, 43; 51, 52, 53; 61, 62, and 63, respectively.

It is particularly noted that stator 21 is configured such that each stem 22 of each phase 40, 50, and 60 is located plus or minus 120 degrees from another stem 22 of each phase. This severely limits any attempts to modify a winding 24 about a stator stem 22 without each winding being similarly modified. Because there is no stem directly opposite (180 degrees) another stem, all stems in stator 21 must be modified analogously. If non-analogous modifications are performed, a radial force unbalance may be introduced when, for the purpose of rotating the spindle, the plurality of coil windings of each phase are sequentially energized to provide conductivity in combination with the magnetic flux from the corresponding poles of the rotor to create an electromagnetic force and rotation torque, at the radius between the outer diameter of the rotor magnet and inner diameter (ID1) of the stator.

Also shown in FIG. 5B is an opening 29 through which a manufacturing winding needle must pass to create each coil winding 24 that is wound around each stem 22. Opening 29 between the stem teeth of stator 21 can range from approximately 1.25 millimeters to 1.12 millimeters, or effectively less if the height or thickness of the coil exceeds the boundary of the stem tooth and thereby reduces the available access. This means that, in addition to the dimension of the opening 29, the capability to wind the stem 22 can also be a function of the coil thickness 77.

Cross-section 97 is an illustrated cross-section taken through a stator stem 22, e.g., stem 62, and its coil winding 24 of motor 20 of FIG. 6B. Stator stem 22 of cross-section 97 is comprised of four lamination layers 25, has a width 71 of approximately 1.3 millimeters and a height 72 of approximately 0.8 millimeters, which provides a stem cross-sectional area of approximately 1.04 square millimeters. This area is sufficient to carry the flux from the poles of the rotor magnets. The outside of the lamination stack, including the stem, is coated with an insulating coating approximately 25 to 50 microns thick so the coil wire is not damaged when it is wound around the stem. Wound around each stem stator 22 is a winding 24 which typically includes six layers of 0.080 millimeter diameter wire. This results in approximately 118 turns per stem equating to 354 turns per phase, and results in a total coil height 76 ranging from approximately 1.88 millimeters to approximately 2.06 millimeters and a total coil width 75 ranging from approximately 2.33 millimeters to approximately 2.51 millimeters for a wound stem 22. The resulting high resistance phase to phase winding, in co-operation with the magnetic flux from the rotor magnet poles, creates a motor torque constant of approximately 2.9 Newton millimeters per ampere.

Those skilled in the art will readily understand for the stator/coil unit 21 and rotor 30 shown in the prior art configuration of FIG. 5B, if the OD1 dimension is reduced and thus the available radial length 78 for the coil winding is reduced, then at a total stator/coil unit height 76 dimension constraint and a phase to phase resistance constraint, fewer turns per phase can be realized, therefore degrading the motor torque constant.

Present spindle motors 20, if reduced in size, may not be able to provide proper operational functionality. By reducing the size (diameter and height) of the spindle motor 20 to comply with other requirements such as electronics card area of the diminutive form factor of miniature hard disk drives, the functionality of spindle motor is reduced. Further, a reduced sized spindle motor 20 may not be able to provide sufficient constant motor torque given the available operational power, the usable real estate within the printed circuit board, and the physical limitations and height constraints inherent of a miniature hard disk drive. Therefore a new stator/coil unit and rotor configuration is needed for the spindle motor for implementation in these low profile hard disk drives of diminutive size.

SUMMARY OF THE INVENTION

Embodiments of the present invention provide a spindle motor for implementation in a low profile hard disk drive. The spindle motor includes a hub having a rotational axis and to which a platter is coupled. The hub is coupled to a suitable bearing system that is coupled to the base of the hard disk drive. The spindle motor also includes a stator portion of material for conducting magnetic flux from the rotor poles, configured to be disposed beneath the platter, and coupled to the disk drive base; that stator having twelve stems and a plurality of windings. The spindle motor also includes a rotor portion, generally disposed beneath the platter and coupled with the hub; that rotor having a backing ring portion of ferromagnetic material fixed to a permanent magnet of sixteen radially polarized poles; that is directly opposed and in close proximity to tips of the stator stems. The number of poles of the rotor portion has a defined proportion relative to the number of stems of the stator portion. In combination with the magnetic flux from the rotor magnet poles, the plurality of windings, when suitably energized and sequenced, provides conductivity for creating an electromagnetic force applied at the torque radius, for the purpose of rotating the spindle hub and its platter. The stator/coil unit and rotor embodiment of the present invention, creates in less volume as compared to that for motors now practiced in the art, the required motor torque for a spindle of a low profile hard disk drive of diminutive size.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
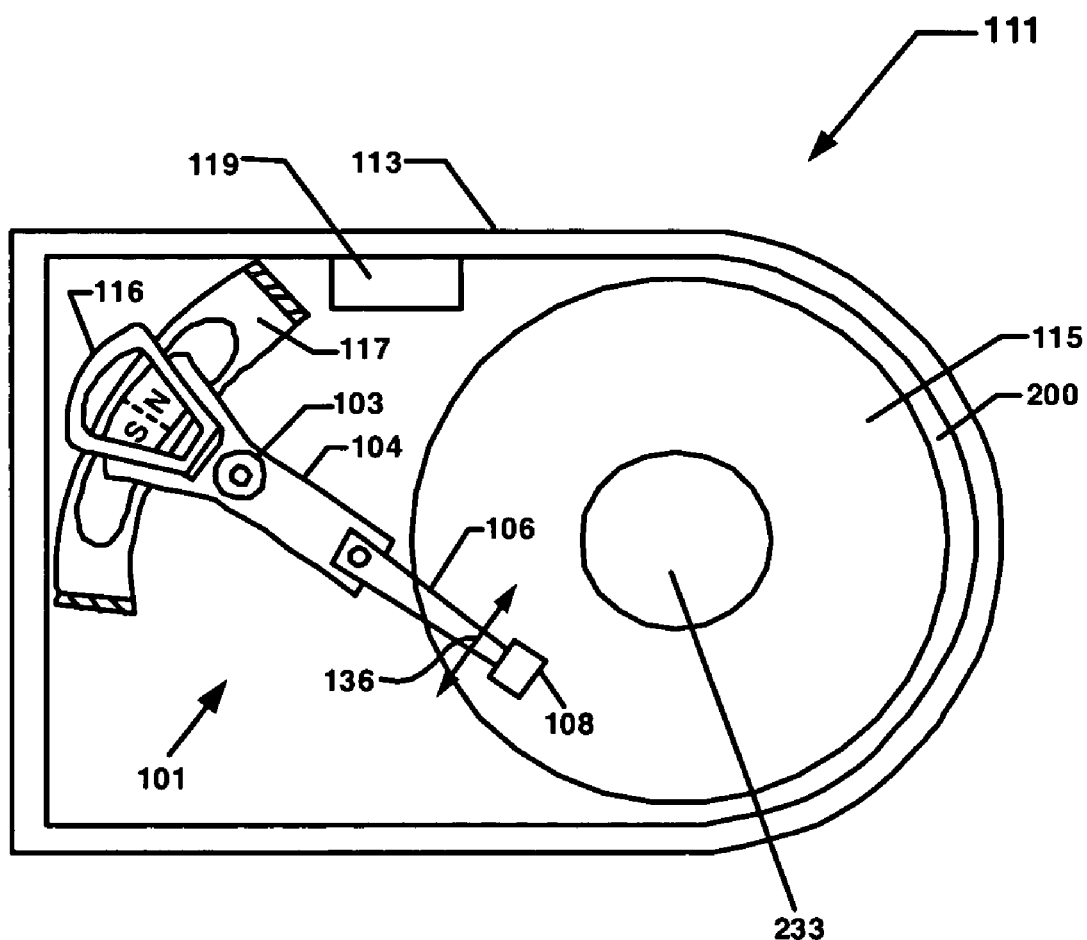
FIG. 1A is an illustrated top view schematic of a hard disk drive illustrating the operational components thereof and in which embodiments of the present invention can be implemented.

A spindle motor for use in a low profile hard disk drive is described. In the following description, for purposes of explanation, numerous specific details are set forth in order to provide a thorough understanding of the present invention. It is noted that one skilled in the art will comprehend that the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processing, and other symbolic representations of operations that can be performed in the fabrication of spindle motors and subsequent assembly of hard disk drives. These descriptions and representations are the means used by those skilled in the data processing arts to most effectively convey the substance of their work to others skilled in the art. A procedure, executed step, logic block, process, etc., is here, and generally, conceived to be a self-consistent sequence of steps, instructions, or fabrications leading to a desired result. The steps are those requiring physical manipulations of physical entities. Usually, though not necessarily always, these entities take the form of structures, elements, and layers implemented during the fabrication of spindle motor and hard disk drive assemblies. It is usual, although not always, that the manipulations, alone or in combination with computer implemented instructions, are performed by a machine particular to the assembly and to the manipulation being performed.

It should be bore in mind, however, that all of these and similar terms are to be associated with the appropriate physical entities and are merely convenient labels applied to these entities. It is noted that throughout the present invention, discussions are presented that refer to the actions and processes of a spindle motor and hard disk drive fabrication process or similar technique that manipulates and transforms those entities into operable hard disk drives or other such data storage enabling devices.

The present invention is discussed primarily in the context of diminutively sized hard disk drives of low profile height. One such miniature hard disk drive (MHDD) is the Microdrive™. Embodiments of the present invention are well suited to be utilized in larger sized hard disk drives of low profile as well. Embodiments of the present invention can be used with alternative types of hard disk drives including, but which is not limited to, low profile hard drives (e.g., 1.8 inch form factor HDDs), embedded hard disk drives, and other data storage devices that have the capability to affect access upon a data storage device and from which data can be stored and/or otherwise manipulated.

A new spindle motor winding is proposed in combination with a miniature hard disk drive to reduce the required motor volume (diameter×height)) without sacrificing the motor torque constant. The motor torque constant should always be as high as possible for the available voltage supply and the given drag load for the spindle system.

FIG. 1A shows a schematic of a hard disk drive 111 having a low profile and diminutive size in which an embodiment of the present invention (not shown) can be implemented. Currently, low profile hard disk drives such as a 1.8-inch form factor; and a Microdrive™ hard disk drive compatible with the Compact Flash Type II form factor, have a height of 5.0 millimeters. In other instances, a Microdrive™ can have a form factor footprint smaller than that of the Compact Flash standard. It is particularly noted that embodiments of the present invention are well suited for implementation in most diminutively sized hard disk drives, including, but which is not limited to, low profile hard disk drives, miniature hard disk drives, and micro drive hard disk drives.

Miniature disk drive 111 includes an outer housing or base 113 containing one (shown) or more magnetic disks 115 and a cover for enclosing that base (not shown). A magnetic disk(s) 115 implemented in a low profile hard disk drive 111 may have an outer diameter ranging from 48 millimeters to smaller than 21.6 millimeters. Further, magnetic disk(s) 115 implemented in a low profile hard disk drive 111 may have an inner diameter ranging from 12 millimeters to smaller than 7 millimeters. Embodiments of the present invention are well suited for implementation in miniature hard disk drives, e.g., drive 111, as well as other smaller sized hard disks. It is noted that embodiments of the present invention are configured for implementation beneath the inner portion of disk 115.

Disks 115 are suitably fixed to a central drive hub assembly 233 of a spindle motor assembly 200 that rotates about a suitable bearing system. An actuator 101 includes a plurality of actuator arms 104 (one shown) in the form of comb that is pivotally mounted above a pivot assembly 103. A controller 119 is also coupled to base 113 for selectively moving the actuator arm 104 relative to disk 115.

In the MHHD 111 shown, actuator arm 104 has extending there from a cantilevered load beam or suspension 106, a magnetic read/write transducer or head 108 mounted on a slider secured to a flexure that is flexibly mounted to each suspension 106. The read/write head 108 magnetically reads data from and magnetically writes data to disks 115. The head gimbal assembly is read/write head and slider 108 mounted on suspension 106. Suspension 106 has a spring like quality for biasing or urging the slider against the disk to enable the creation of air bearing film, or air bearing surface, between the slider and the disk surface. Also mounted to actuator arm 104 opposite the head gimbal assembly is a voice coil 116 housed within a conventional voice coil motor magnet assembly 117 (top pole not shown) having a magnet 118 (shown in FIG. 1B). Movement of actuator 101 by controller 119 causes the head gimble assembly to radially move across tracks on the disks 115 (as indicated by arrow 136) until heads 108 settle on the target tracks.

Figure 1B:
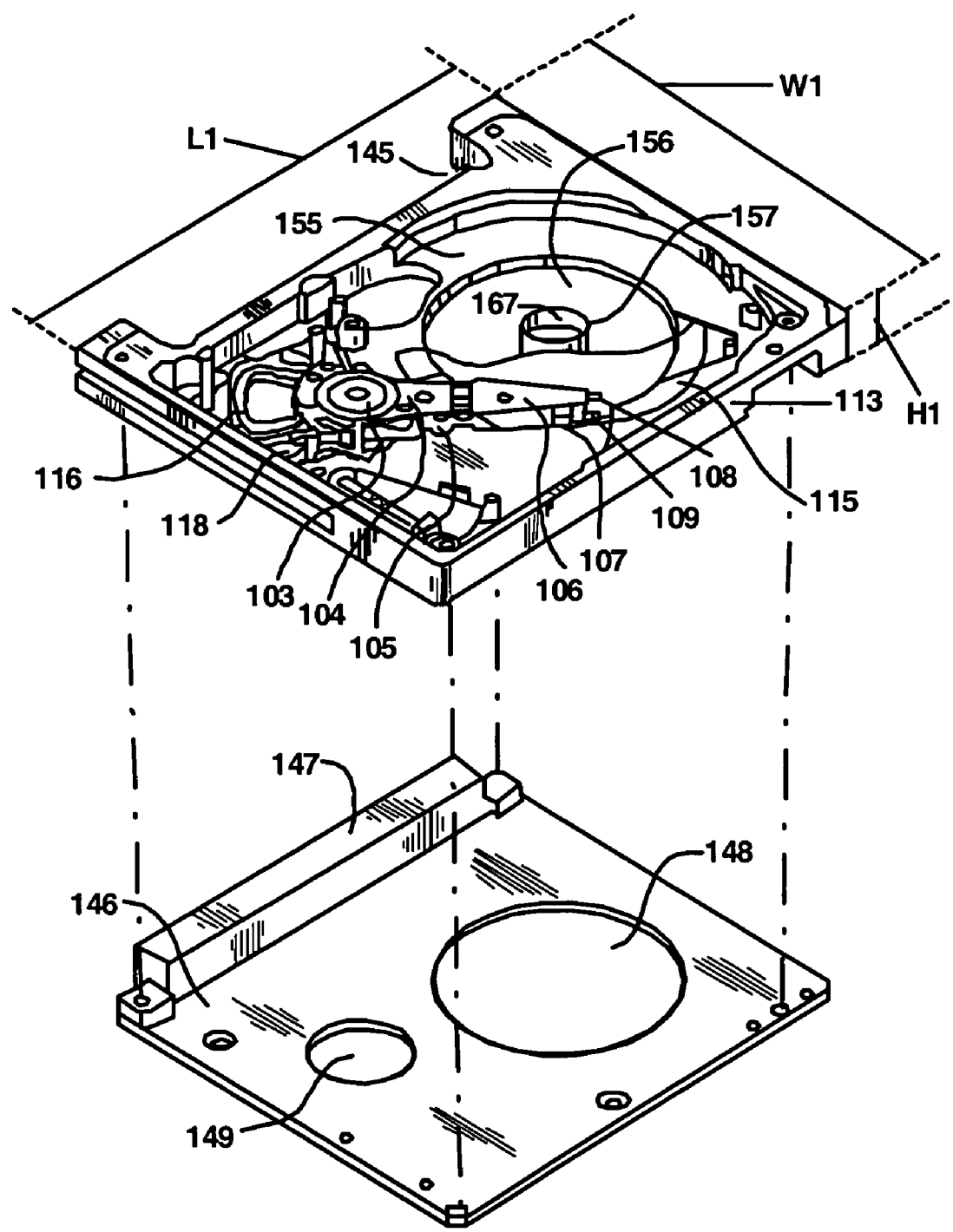
FIG. 1B is an illustrated exploded view of a diminutive sized hard disk drive of FIG. 1A in an embodiment of the present invention shown without the spindle components.
Figure 1C:
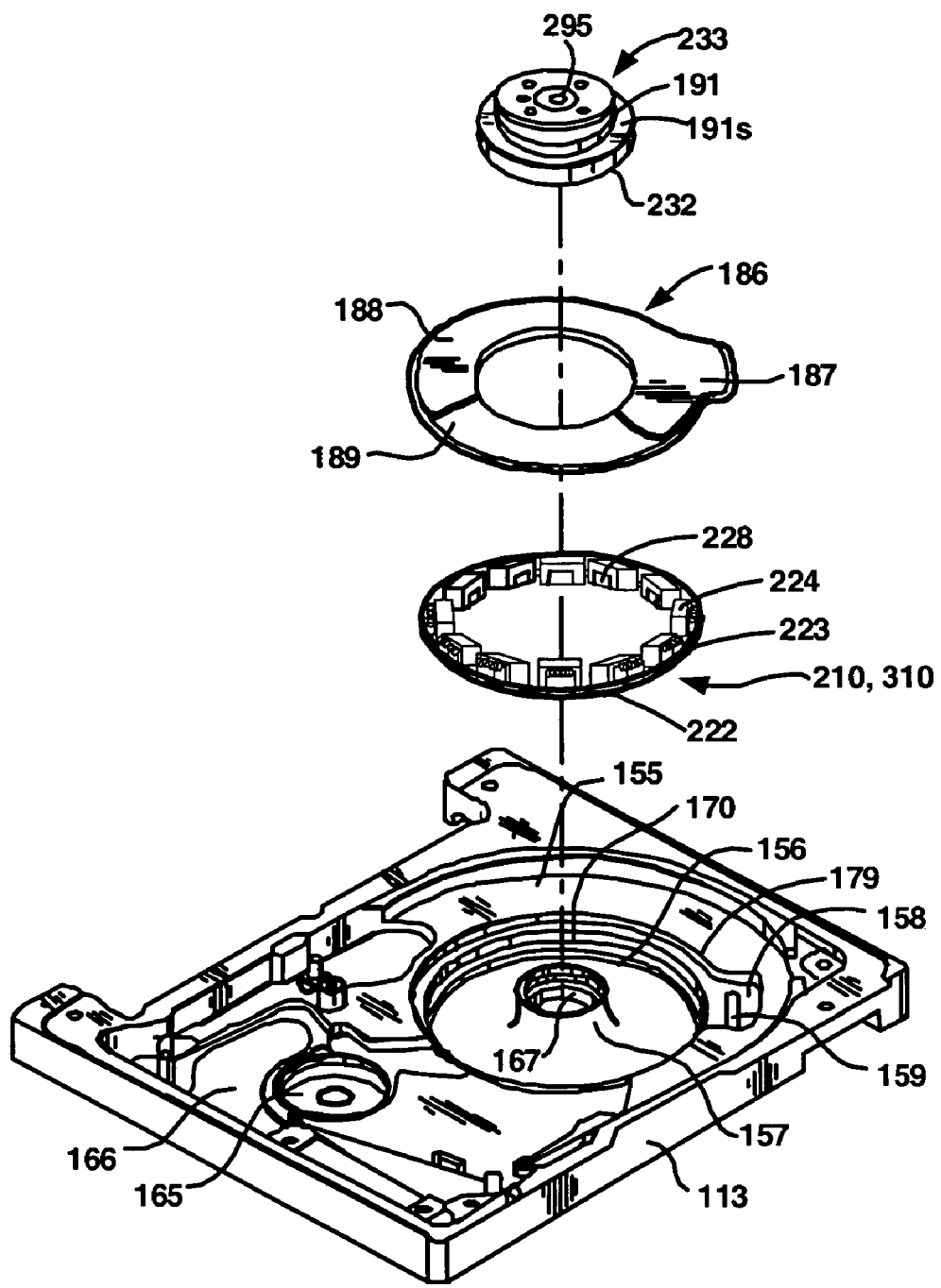
FIG. 1C is an additional illustrated exploded view of the hard disk drive of FIG. 1B in an embodiment of the present invention.

Co-operatively, FIGS. 1B and 1C show the exploded perspective views of the major portions of low profile hard disk drive 111 of FIG. 1A. FIG. 1B shows the electronics card assembly 146, and the base 113 with its actuator assembly as previously described. However, base 113 is not shown with any of the spindle assembly components. FIG. 1C is this same base 113, with the actuator removed, but does shows the key portions of the spindle assembly excepting the bearing system. In an embodiment, the spindle components of the present invention are more readily defined and understood referring to their illustration in the plane and side elevation views of FIGS. 2A-2D. FIGS. 1A-1C are representative of an MHDD in which other embodiments of the present invention may be implemented as described herein with reference to FIGS. 3A-3B and 4A-4C.

The top side of base 113 for hard disk drive 111 is shown in the upper portion in FIG. 1B and in 1C. Whereas the base 113 shown has the footprint dimensions for the Compact Flash Type II wherein length L1 approximates 42.8 millimeters, width W1 36.4 mm, and height H1 5.0 millimeters; the base could have dimensions smaller or larger than these. However, for a low profile hard disk drive, e.g., drive 111, a form factor height H1 of 5.0 millimeters or smaller is common. Base 113 functions as the housing of disk drive 111 and has a formed disk holding recessed portion 155 substantially in the entire top surface and a circular recessed portion 156 in which magnetic circuits of the spindle motor are held. At the center of recessed portion 156 is formed a strut portion 157 protruding upwards. Strut portion 157 is coupled to the stationary side of the bearing system of a spindle motor 200 having a rotor hub assembly 233. It is noted that the exact shape of strut portion 157 may vary, as it is dependent upon the specific bearing system utilized for the spindle motor. Circular recess portion 156 may also possibly have through slots or holes (not shown), each conforming to the footprint of a coil of the stator assembly, so surface 156 does not interfere with the bottom side of the stator coils, it they are not of a sufficiently low profile. These openings are typically closed and sealed with a pressure sensitive film on the outside surface of portion 156.

On the L1 side of the base is a notch 145 for accepting a standard interface connector 147 of printed circuit card 146. At the bottom of base 113 shown in FIGS. 1B and 1C exists two circular projection bottom structures (not shown). One is formed at the other side of circular recessed portion 156 that houses a stator coil unit, e.g., 210, 310 and 410 of spindle motors 200, 300 and 400, respectively. The other bottom portion (not shown) is formed at the other side of a supporting recessed portion 165 (shown in FIG. 1C) for supporting the pivot structure 103 of the actuator assembly. Both circular projection bottom portions are protruded slightly from the bottom of base 113 and typically extend essentially to the limit of the form factor height H1 of the MHDD, and therefore through the footprint of the electronics card. The diametrical size of the spindle circular projection is minimized with the present invention.

FIG. 1B further includes a printed wire board or a printed circuit board, card 146, is used to mount necessary electronic parts for enabling hard disk 111 to function. Card 146 is provided with an interface connector 147 at a side thereof. Connector 147 is connected electronically with an external device.

Card 146 includes formed fitting holes 148 and 149 so as to face circular projection 156 and supporting recessed portion 165 and the bottom portion of base 113, respectively. The size of card fitting hole 148 is minimized with the present invention, which in turn maximizes the card surface area for electronic components. Card 146 is conventionally fixed to the bottom of base 113. Connector 147 is fit in notch portion 145 of base 113.

In an embodiment of the present invention, the external size of card 146 has a size marginally smaller than the L1×W1 footprint of disk drive 111 where L1 equals 42.8 millimeters and W1 equals 36.4 millimeters. It is particularly noted that in alternative embodiments, card 146 may have an external size larger or smaller than that of the external size described herein.

FIG. 1C illustrates a more detailed examination of base 113 of FIGS. 1B which shows at the inner periphery of the circular recessed portion 156, a first holding step 170 and a second holding step 179. The first holding step 170 enables an outer ring portion 223 of a stator coil unit 210 and 310 to be fit therein. Second holding step 179 enables the circumferential portion of a shielding plate 186 to be fit therein.

Additionally, another lead recessed portion 158 is also formed at the inner periphery of the circular recessed portion 155. The lead recessed portion 158 is extended outwards at the same height as that of second holding step 179. A lead hole 159 for passing the lead wire of the stator coil is formed at lead recessed portion 158 so as to pass through the base 113 vertically.

Shielding plate 186 is fit in the second holding step 179 and fixed there by an adhesive agent so as to cover the stator coil unit 210, 310 and 410 held in the circular recessed portion 156 of base 113. Protruded portion 187 of shielding plate 186 also covers lead recessed portion 158 of the base 113.

Shielding plate 186, formed through press working, is composed of two stepped portions, a planar portion 189 and an elevated portion 188, elevated from the planar portion 189. Shielding plate 186 is axially positioned beneath the disk so that from the surface of planar portion 189 enough clearance is kept when actuator arms 105 rotate below the recording surface of disk 115 and suspension 106 traverse this region. Elevated portion 188 of shielding plate 186, in addition to leaving a generous clearance space for the remaining the stator coil windings in this region, is also elevated because a lead wire of each coil phase is guided up to lead hole 159 formed in lead protruded portion 158 in a necessary space. Beneath shield plate portion 188, the coils wound on the stems under this region have a greater separation to the shield plate than those stem coils that reside beneath that portion 189.

Still referring to FIG. 1C, stator coil units 210 and 310 have a stator structure that is comprised of a set of stacked steel laminations having a ring-like outer ring portion 223 and a predetermined number of stator spokes or stems 222 extruding radially inward there from. In the embodiment shown in FIGS. 1C and FIGS. 2A-2D, twelve stator stems 222 are utilized. Typically stator stems 222 terminate in the shape of a 'T', and have an arcuate surface shape 228 formed so that its surface is contoured to face and achieve greater proximity to a rotor magnet at a wide portion and in uniformity. Alternatively shaped stator stems may also be implemented. This region of the stator lamination it is also commonly referred to as a stator stem shoe tip or pole shoe 228. Coils 224 are wound around protruded stems 222.

The stator coil unit, e.g., 210 and/or 310, as described above is fixed so that its outer ring portion 223 is fit in the first holding step 170 formed at base 113. The angular orientation of stator coil units 210 and 310 at base 113 are such that, in operation, suspension 106 (107) is positioned so that the tracing of the magnetic head 108 (109) is positioned substantially at a middle portion between two adjacent protruded stems 222 when actuator arms 104 (105) are rotated.

Stator coil units 210 and 310, and each units corresponding hub and magnetically poled rotor, are more particularly described later in the plane views and side elevations of FIGS. 2A-2E and FIGS. 3A and 3B.

A hub, e.g., rotor hub assembly 233 is held at the strut portion 157 of the base 113 via the stationary side of a bearing system. In an embodiment of the present invention, the bearing system can be a fluid dynamic bearing having a rotating shaft. Alternatively, the bearing system can also be, and is not limited to, a fixed shaft fluid dynamic bearing, a rotating shaft ball bearing or a fixed shaft ball bearing. A fluid dynamic spindle bearing system is best described referring to spindle side elevations of FIGS. 2D, 3B, and 4C.

Hub 233 is formed so that its outer portion is substantially like a cup and the center shaft 237 is fitted to it. The cylindrical surface 239r of shaft 237, in co-operation with the bore surface 239s of stationary sleeve 235, forms the radial fluid journal bearing. Similarly orthogonal surface 236s of stationary sleeve 235 works in co-operation with the opposing surface 236r of the rotating hub to define a unidirectional thrust bearing that is pre-loaded by the attraction of the rotor magnets 232 (432) to the ferromagnetic base, or a ferromagnetic plate under the rotor magnet on base surface 156. A fluid dynamic bearing, such as that described herein, is filled with some form of fluid lubricant that supports the rotating surfaces from the corresponding stationary ones preventing metal-to-metal contact. Conventionally, a common fluid used is oil, with alternative implementations utilizing alternative fluids including, but which is not limited to, water or a gas. In an embodiment of the present invention, an oil lubricated fluid dynamic bearing is utilized. As the thrust bearing is unidirectional, a stopper plate 234 (434) is fixed to the rotating hub with a surface of the stopper plate closely axially spaced to an opposed surface in stationary sleeve 235 to limit the axial motion of the rotating hub assembly in the case of a high acceleration shock event. A stationary plate 235p sealed by capillary adhesive closes the bottom bore 239s of sleeve 235 to contain the fluid at this point. At the extreme perimeter of thrust surface 236r and 236s, the fluid is retained by capillary action and centrifugal forces as a consequence of the corresponding geometric shapes in this region for the rotating hub and stationary sleeve.

Typically, but not always, one surface of the journal and thrust bearing, commonly stationary sleeve 235 surfaces 239s and 236s, is/are suitably patterned with spiral herringbone grooves to enhance the fluid pressure profile. In the rotating shaft configuration, the shaft is preferably of a material of higher thermal expansion than the sleeve to create a wider journal gap at low temperatures in order to minimize the bearing drag of the increased viscosity of the fluid at these temperatures. For example the shaft could be aluminum, with a hard surface plating such as nickel-plating if required for tribological reasons. A shaft comprised of a 300 stainless steel is another option. Correspondingly, a sleeve of a 400 stainless steel is preferred thermally, but could also be of a different material such as bronze or sintered bronze in order to facilitate the creation of the bearing patterns.

Still referring to FIG. 1C, hub 233, can be constructed from a 430 stainless steel for thermal expansion compatibility with a glass disk; and to jointly function as the rotor shield 191s and back iron 231 for the rotor magnets 232 that define the rotor assembly 230. If hub 233 is of aluminum for an aluminum disk, a separate unique back iron member 231 (not shown) of ferromagnetic material can be fitted to the aluminum hub to create rotor assembly 230. Similarly, a separate ferromagnetic shield member 191s can also be added.

A flange 191 is formed around the top end of the outer peripheral wall portion of hub 233 and the extreme inner peripheral portion of disk 115 is placed on this flange 191. Also part of hub 233 is fixed a ring-like magnetic shielding member 191 s so as to be adjacent to flange 191. Clamping device 296 is loaded by screw 295 and fixes hard disk 115 against rotor hub flange 191, and the disk is thus rotated unitarily with the hub 233. In an embodiment of the present invention, clamping device 296 is a Belleville type spring clamp. Alternatively, other clamping devices can be implemented to provide a holding load on disk 115.

On the outer peripheral surface of hub 233 on the surface of the back iron 231 (not shown) and extending in a radial direction are disposed a predetermined number of rotor magnet poles at equal pitches. Each rotor magnet pole 232 is magnetized in the radial direction and the rotor magnetic poles are disposed so that an N-pole and an S-pole are alternated in the same direction with respect to the adjacent poles. The axial height of the poled magnetic rotor is approximately 1.4 mm; with an outer diameter that can range from approximately 9.4 to 10 millimeters with a corresponding inner diameter of 7 to 7.6 mm.

Figure 2A:
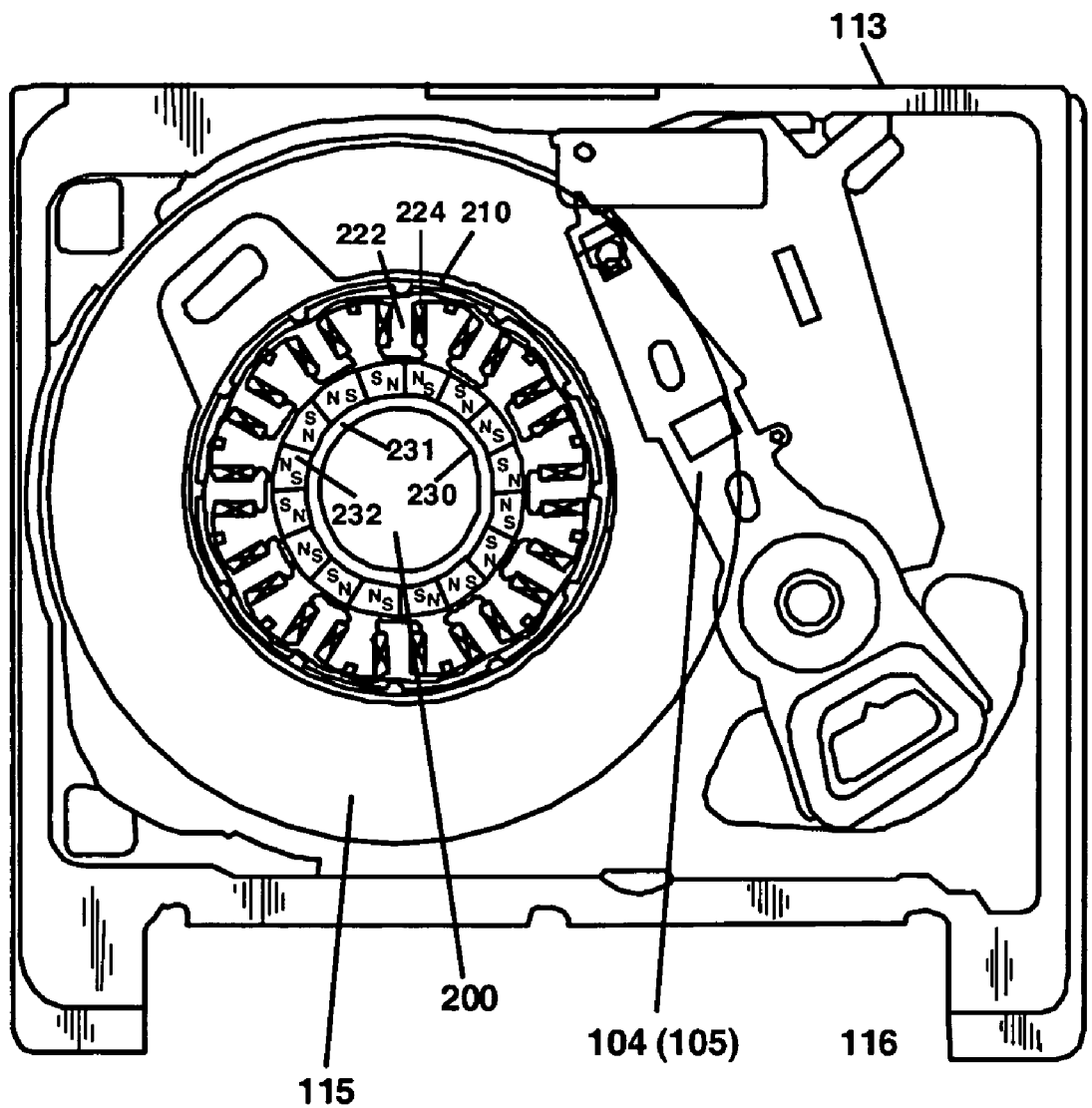
FIG. 2A is an illustrated top view of a spindle motor implemented in a diminutively sized hard disk drive of FIGS. 1A-1C, in an embodiment of the present invention, shown with the spindle hub removed and only outside diameter of the disk defined.

FIG. 2A is a top view illustration specifically showing the stator assembly 210 and inner rotor assembly 230 components of spindle motor 200 implemented in a disk drive 111, in an embodiment of the present invention. Disk drive 111, in which spindle motor 200 is implemented, is functionally analogous to miniature hard disk drive 111 of FIGS. 1A-1C; and includes the previously described actuator assembly 101. In FIG. 2A, the perimeter outline of disk 115 is shown, but the spindle hub assembly components such as the bearing and disk clamping system have been removed. Stator 210 has 12 slots or twelve stator stems 222 and around each stem is wound a coil winding 224. The inside rotor assembly 230 is comprised of a back iron 231 and magnet assembly 232 which, in an embodiment of the present invention, has sixteen poles in a predetermined 4:3 ratio to the number of slots. In another embodiment, outside stator 210 may be comprised of 15, 18, 21, 21, or 24 slots with a corresponding pole count of 20, 24, 28, and 32, respectively. However in these configurations, there is an increasing manufacturing difficulty in practically creating the monofilar coil windings around the stems.

Figure 2B:
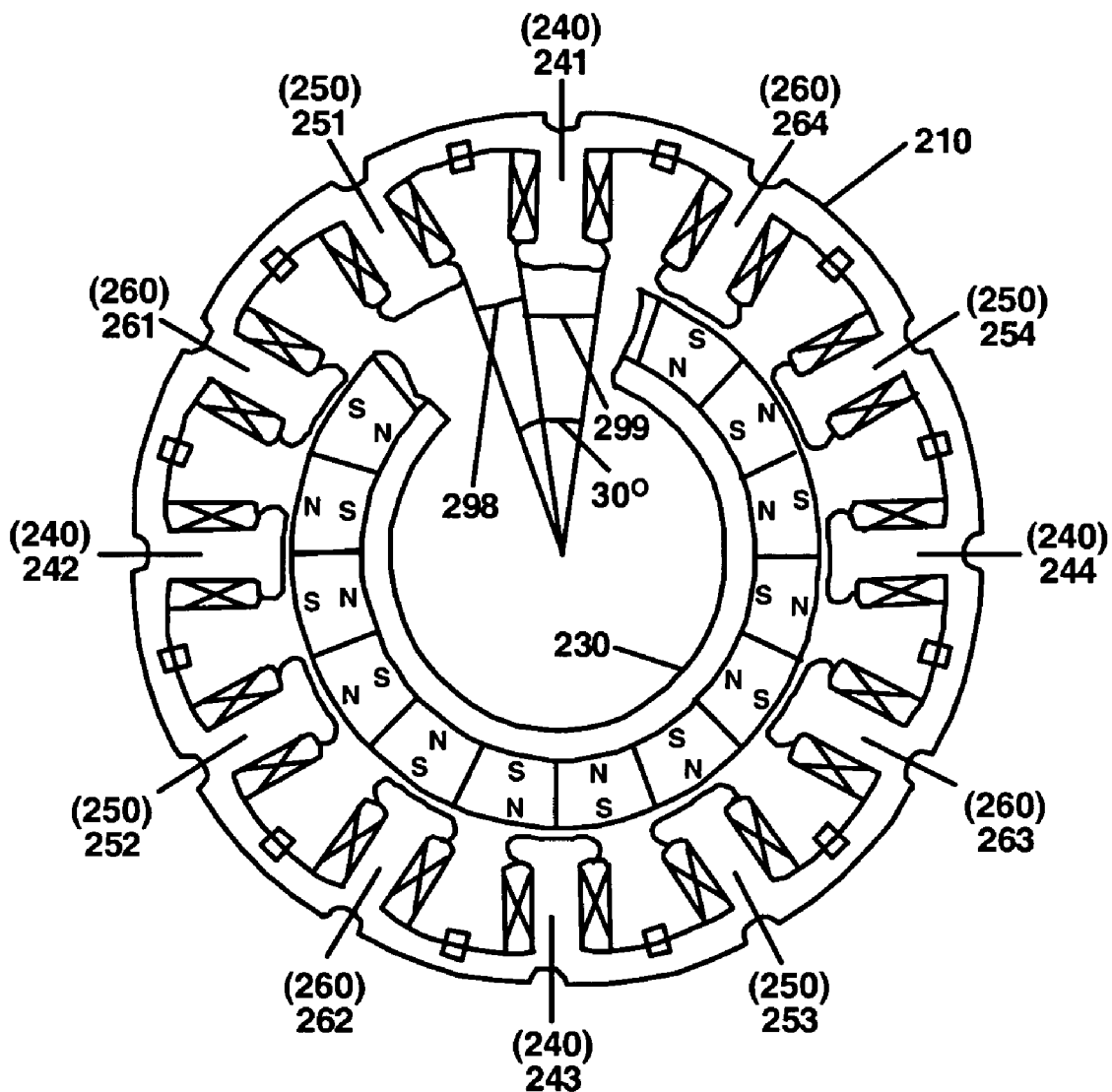
FIG. 2B an illustrated top view of just the motor stator/coil unit and rotor shown removed from the hard disk drive base of FIG. 2A, in an embodiment of the present invention.

In a embodiment of the present invention, FIG. 2B is a top plane views of the inner rotor assembly 230 and the outer stator assembly 210 of spindle motor 200 removed from hard disk drive 111. Stator assembly 210, is comprised of a stator constructed from a set of stacked steel laminations 225, and has a three phase coil winding, with phases 240, 250 and 260, respectively. Phase 240 is comprised of wound coils on radially inwardly projecting stems 241, 242, 243, and 244. Phase 250 is comprised of wound coils on radially inwardly projecting stems 251, 252, 253, and 254. Phase 260 is comprised of wound coils on radially inwardly projecting stems 261, 262, 263, and 264.

Figure 3A:
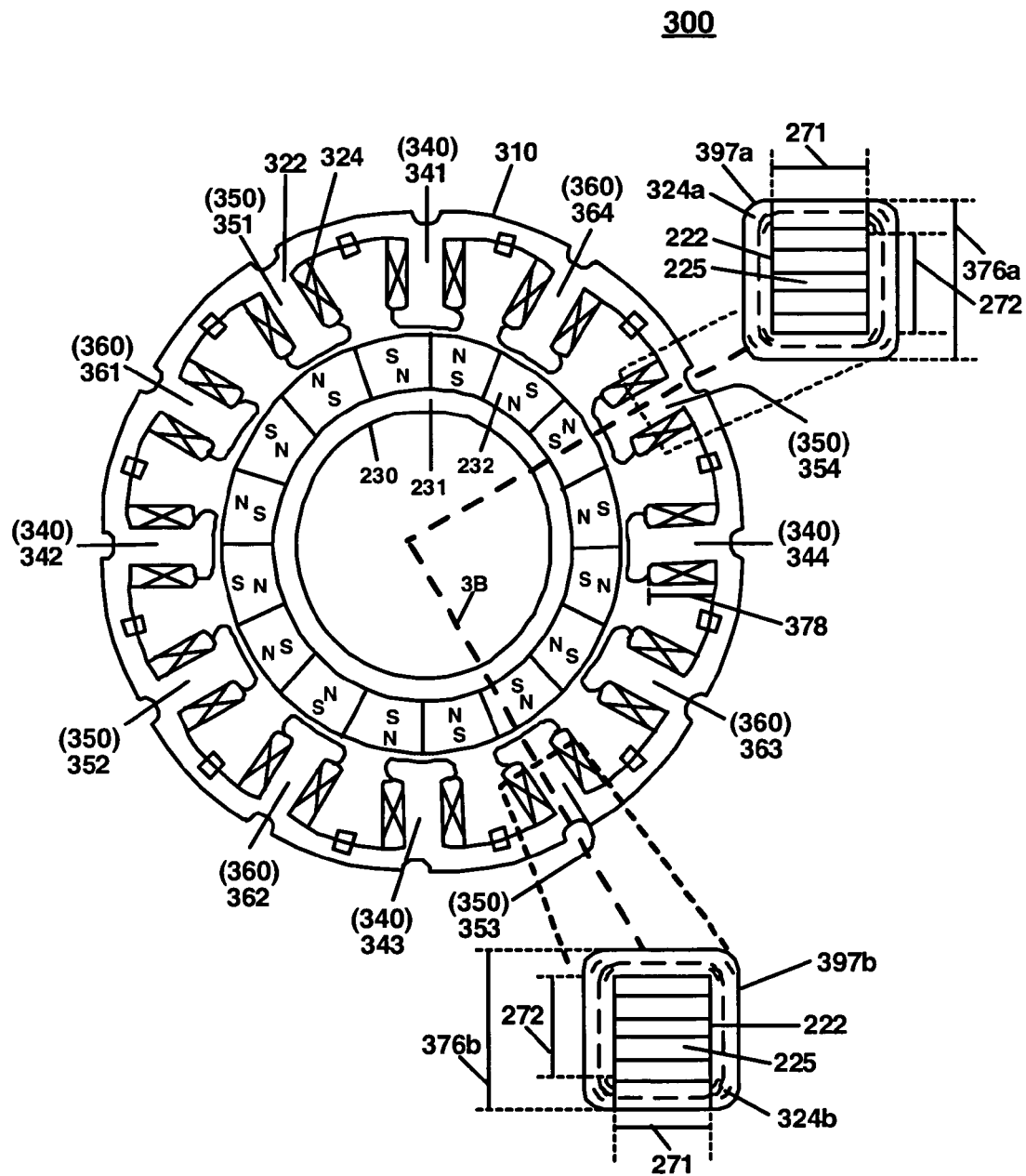
FIG. 3A is an illustrated top view of the stator/coil unit and rotor shown removed from the hard disk drive base of FIG. 2A showing two different cross-sections for the stator stem and each stator stem winding, in another embodiment of the present invention.
Figure 3B:
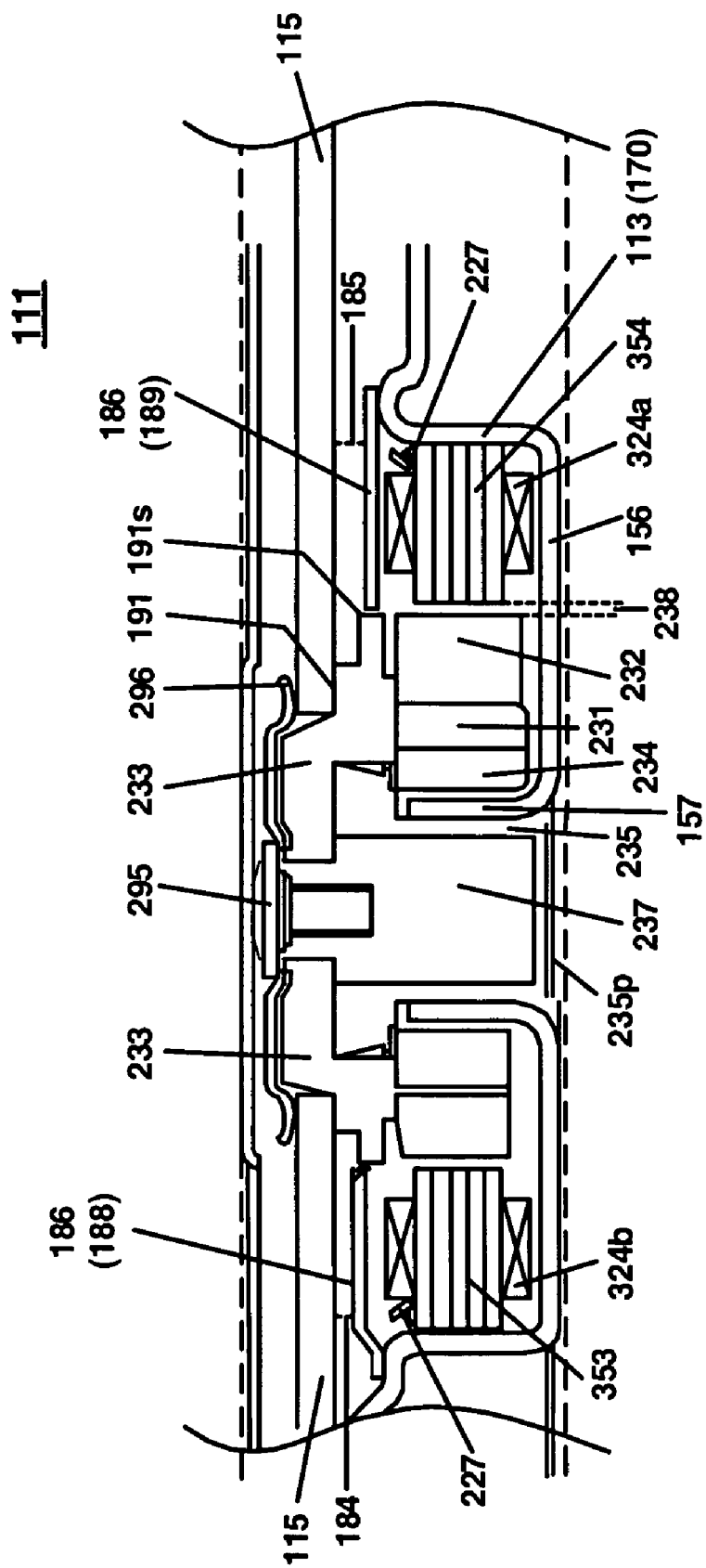
FIG. 3B is an illustrated side view elevation taken in the direction shown in FIG. 3A of a diminutively sized hard disk drive having the stator/coil unit and rotor of FIG. 3A implemented therein, in an embodiment of the present invention.

Within stator 210, in an embodiment of the present invention, the coil windings 224 around each protruded stem 222 (e.g., stems 241, 242, 243, 244, 251, 252, 253, 254, 261, 262, 263 and 264) of each phase (e.g., phases 240, 250, and 260) are analogous in wire size (wire diameter), coil winding length 278, mean turn length around a stem 222, and the number of coil turns that are disposed around each protruded stem. Alternatively, in another embodiment of the present invention, the coil winding around each protruded stem may not be analogous, as shown in FIGS. 3A and 3B. In operation, stator assembly 210 has sets of stator stems selectively energized, in sync and co-operation with the rotor position, to create the motor torque and effect hub rotation.

FIG. 2B further shows, in an embodiment of the present invention, a basic pitch angle of 30 degrees for the 12 slot stator, wherein that pitch angle is partitioned between a slot angle 298, and a tooth angle 299. A wider slot angle, while enabling easier winding, can cause an increase in torque ripple. However, it is noted that a twelve-stem stator and a sixteen-pole rotor inherently causes less torque ripple than a nine stem stator having a twelve pole rotor. Slot angle 298 has a direct correspondence to a coil winding needle opening, e.g., opening 229 of FIG. 2C. In an embodiment of the present invention, slot angle 298 can range from approximately 11.0 degrees to approximately 12.5 degrees. Accordingly, tooth angle 299 can vary from approximately 19.0 degrees to approximately 17.5 degrees. It is noted that alterative degrees for slot angle 298 and tooth angle 299 may be used. It is also noted that if the coil is excessively thick, e.g., dimension 277, then opening 229 effectively is reduced for the coil winding needle.

Figure 2C:
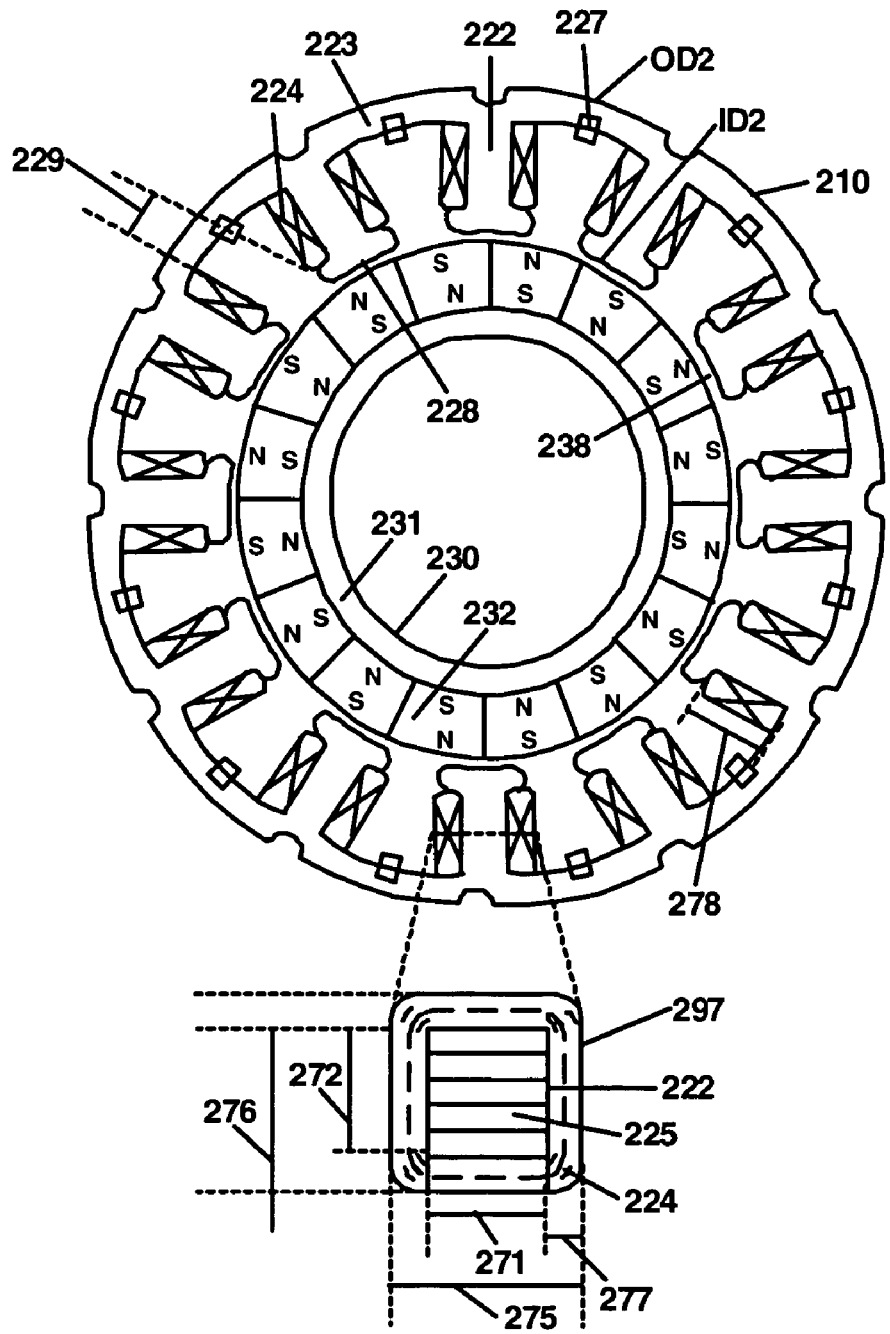
FIG. 2C is another illustration of the stator unit and rotor unit of FIG. 2B, in an embodiment of the present invention, with an orthogonal cross-section of the stator stem and coil winding shown.

In an embodiment of the present invention, and with reference to FIG. 2C, well-known techniques may be implemented in the fabrication of the stator core comprised of stacked steel laminations 225, each lamination having a geometry described as having an outer ring portion 223, with 12 spokes or stems 222 radially projecting inwardly that terminate in a "T" shape tip or pole shoe having an arcuate shape 228 generally conforming to the radius of the magnetized rotor. Individual lamination thickness for this type of motor can range from 0.15 mm to 0.2 mm. Therefore with a stack comprised of 5 or 6 laminations; stator heights 272 in the range from 0.75 millimeters to 1.00 millimeters can be constructed. The cross-sectional area, e.g., dimensions 272×271, of each stem must be sufficient to carry the magnetic flux from the magnetized rotor poles. Similarly the minimum cross-sectional area of outer ring 223 has to have a defined percentage of this stem area. These areas must be sufficiently large to carry the flux but not oversized as this would negatively impact the mean length of a coil turn, and the number of coil turns possible and the coil resistance; all of which contribute to the definition of the allowable motor torque constant.

Stator assembly 210 also includes a wire guide 227 for guiding the coil winding 224 from stage one of each radially projected stator stem 222 phase, to the next succeeding stage stem in that phase.

Continuing with reference to FIG. 2C, stator assembly 210 is shown to include a winding opening 229 for providing space through which the coil can be wound around each stator stem. In an embodiment of the present invention, the size of winding opening 229 may range from, but is not limited to, approximately 1.02 millimeters to approximately 1.07 millimeters. It is noted that smaller winding needles may be implemented to achieve the windings and, as such, opening 229 can be appropriately adjusted.

In an embodiment of the present invention, a coil winding, e.g., coil winding 224, can be realized through utilization of a winding needle in which the winding needle can range from a 0.5 millimeter needle to a 0.7 millimeter needle. In an alternative embodiment, winding needles smaller that 0.5, or larger than 0.7 millimeters may be used. Further, in an embodiment of the present invention, the reach of the winding needle can range from approximately 2.5 millimeters to approximately 3.5 millimeters. In other embodiments the reach of the winding needle may be shorter than 2.5 or longer than 3.5 millimeters.

In FIG. 2C, outer stator assembly 210 is shown, in an embodiment of the present invention, to have an outer diameter (OD2) approximating 15.6 millimeters, an inner diameter (ID2) approximating 10.3 millimeters, with a 0.15 mm radial clearance between the stator stem shoe tip 228 of a stator stem 222, (ID2), and the outer surface of a magnet 232 of rotor assembly 230. In another embodiment of the present invention, stator assembly 210 can have an outer diameter (OD2) approximating 14.9 millimeters and an inside diameter (ID2) of 9.7 millimeters. Alternatively, stator assembly 210 can have outer and inner diameters that may be smaller or larger than those dimensions described herein and, as such, the dimensions shown should not be construed as limiting.

Still with reference to FIG. 2C, shown is stator stem/coil cross-section 297, an illustrated cross-section taken through a stator stem 222, e.g., stator stem 243 of FIG. 2B, and its coil winding 224, in an embodiment of the present invention. In an embodiment of the present invention, stator stem 222 of cross-section 297 is comprised of five lamination layers 225, has a width 271 of approximately 0.9 millimeters and a height 272 of approximately 1.0 millimeters, which provides a stator stem cross-sectional area of approximately 0.9 square millimeters. An alternative lamination stack would be five layers of 0.19 millimeter thickness and a width 271 of approximately 0.95 for a height 272 of approximately 0.95 millimeters to yield the cross-sectional area of 0.9 square millimeters. This area is sufficient to carry the flux from the poles of the rotor magnets. Typically the stack of stator laminations is coated with an insulating layer from 25 to 50 microns thick to protect the coil wire from being damaged when it is wound.

In combination with the coupled magnetic flux, the number of coil turns around each stem will establish the motor torque constant Kt, but there is also a phase to phase total resistance constraint on coil winding. Typically for a MHHD spindle the size of a Microdrive, a phase to phase resistance as high as 16.5 ohms still gives an acceptable motor current/resistance voltage drop, consistent with a supply voltage of 3.3 volts; and the possible condition of an initial very high spindle bearing drag if the MHHD is initially at a very low temperature such as minus 10 degrees C.

The resistance of each coil phase is a function of the wire size (wire diameter) and wire material (copper is preferred for it resistivity per cross-sectional area); and the total wire winding length per phase. The wire winding length is a function of the mean length per turn of all turns around the stem; times the total number of turns per stem, times the number of stems per phase. A square, or nearly square stem cross-section, has the most efficient mean turn length. Turn mean length is also impacted by the number of layers for the turns. Four layers are better than six in terms of minimizing the turn mean length as well as minimizing the overall coil physical thickness dimension 277. The available wound coil length 278 is set by the stator dimensional constraints; and therefore the wire diameter will establish the number of turns possible per layer; and therefore the turns per stem that is consistent with phase to phase resistance requirement.

In an embodiment of the present invention, wound around each stem stator 222 is a winding 224 having four layers of 0.068 millimeter diameter wire. This results in approximately 72 turns per stem equating to 288 turns per phase, and results in a total stator coil height 276 ranging from approximately 1.67 millimeters to approximately 1.83 millimeters and a total coil width 275 ranging from approximately 1.52 millimeters to approximately 1.68 millimeters for a coil wound on stator stem 222. The resulting high resistance phase to phase winding, in co-operation with the magnetic flux from the rotor magnet poles, creates a motor torque constant of approximately 2.9 Newton millimeters per ampere.

Figure 2D:
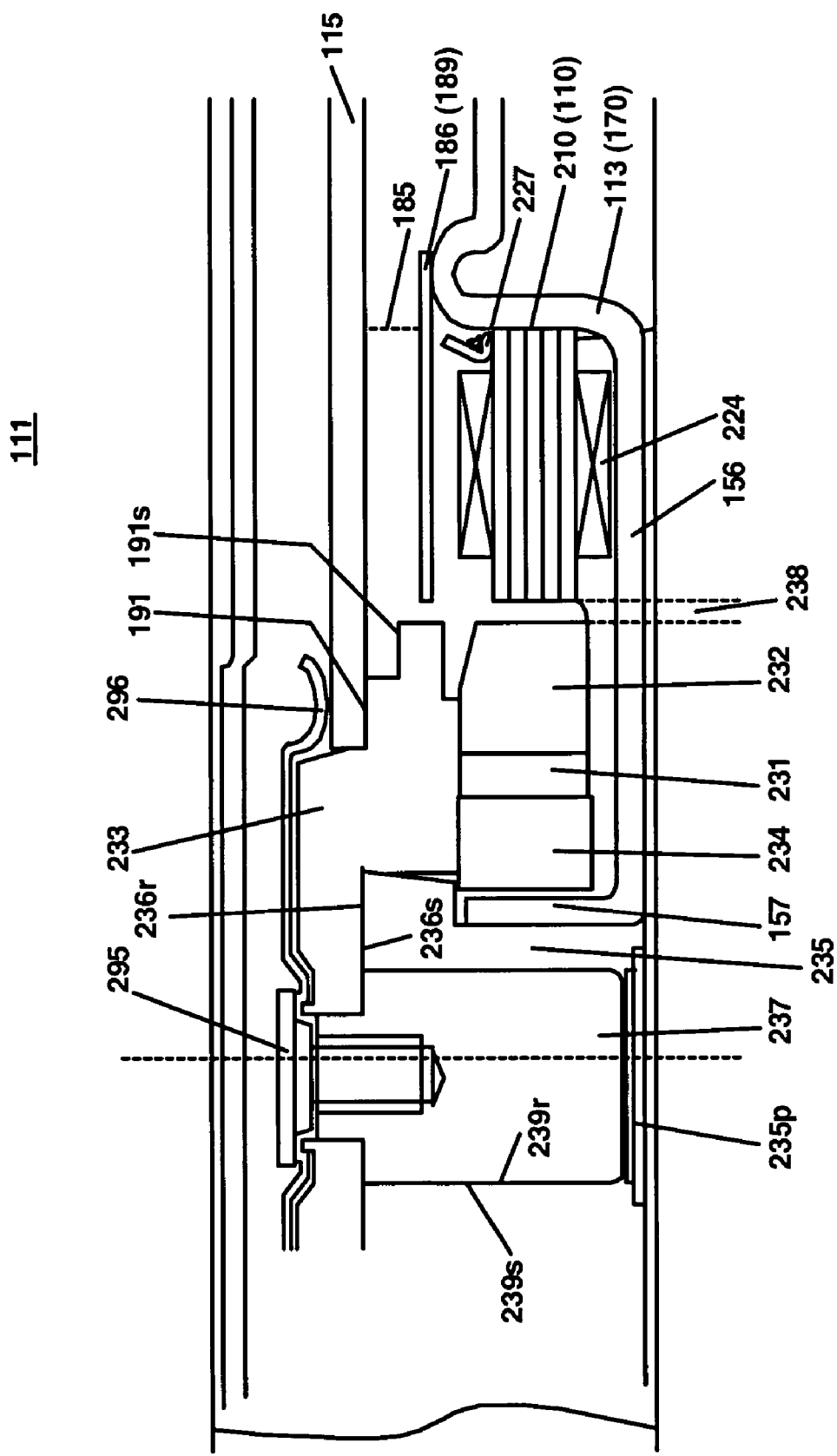
FIG. 2D is an illustrated side view elevation of a diminutively sized hard disk drive of FIGS. 1A-1C in which a spindle motor of FIGS. 2B and 2C is implemented, in accordance with an embodiment of the present invention.

FIG. 2D is a side elevation view of a low profile hard disk drive 111 in an embodiment of the present invention showing the key components of the spindle assembly as previously described. Hard disk drive 111 is analogous to drive 111 of FIGS. 1A-1C and FIGS. 2A-2C, and includes a spindle motor 200 having an outer stator assembly 210 and an inner rotor assembly 230 in an embodiment of the present invention. Stator assembly 210 includes stator stem 222 around which is disposed a winding 224, and a wire guide 227. Opposed and approximately axially symmetrical with the stator pole shoes is a rotor 230 comprised of sixteen magnetic radial poles 232, having an axial height of approximately 1.4 millimeters in an embodiment of the present invention. A radial gap 238, the space between innermost dimension of stator assembly 210 and the outermost dimension of magnet 232 of rotor assembly 230 has a dimension of approximately 0.15 mm. Also shown is space 185 between disk 115 and stator shield plane 189 of stator shield 186. Space 185 is required to provide adequate clearance between disk 115 and stator shield 186 so that head 108 (109) and suspension 106 (107) of actuator 104 (105) can be rotated to a proper orientation in relation to tracks on disk 115.

Figure 2E:
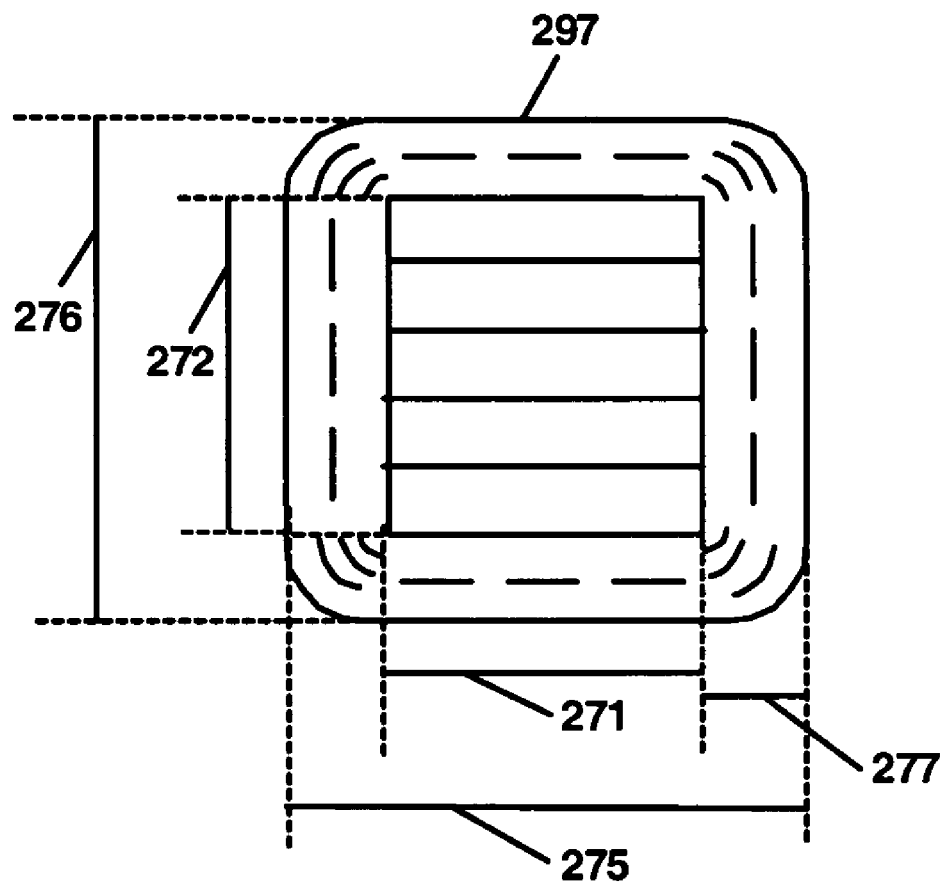
FIG. 2E is a cross-section of the stator stem from FIG. 2C in an embodiment of the present invention.
Figure 2F:
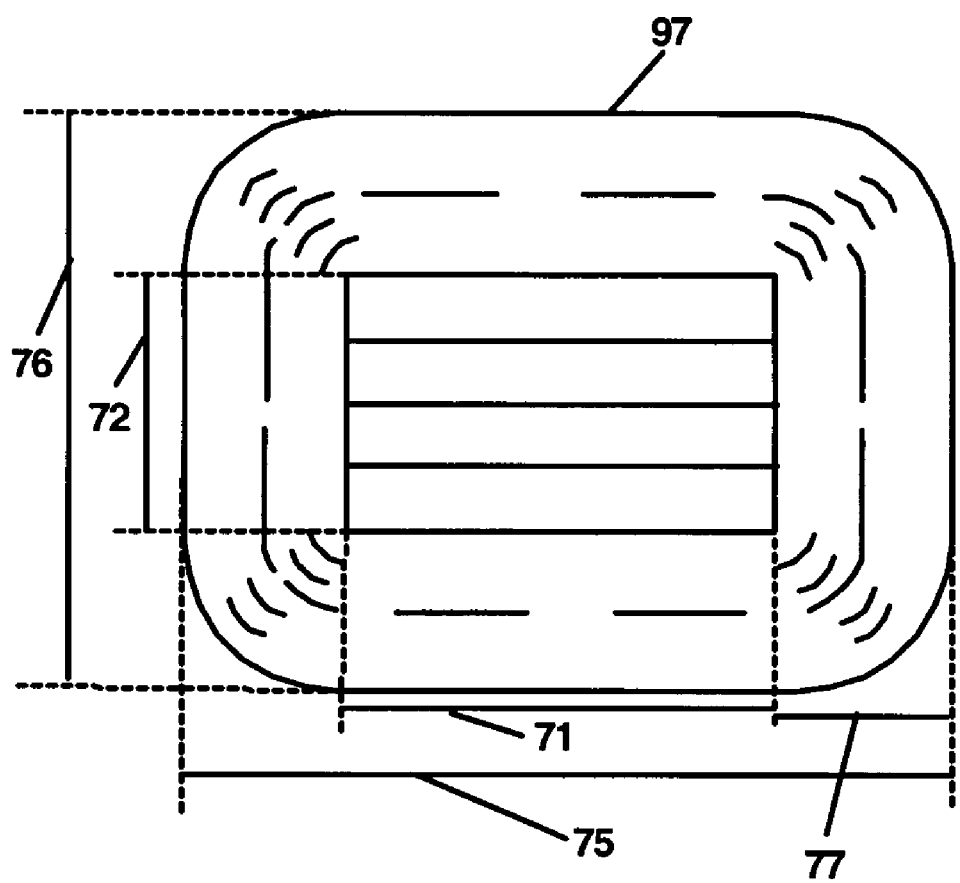
FIG. 2F is a cross-section of the stator stem from FIG. 5B.
Figure 5A:
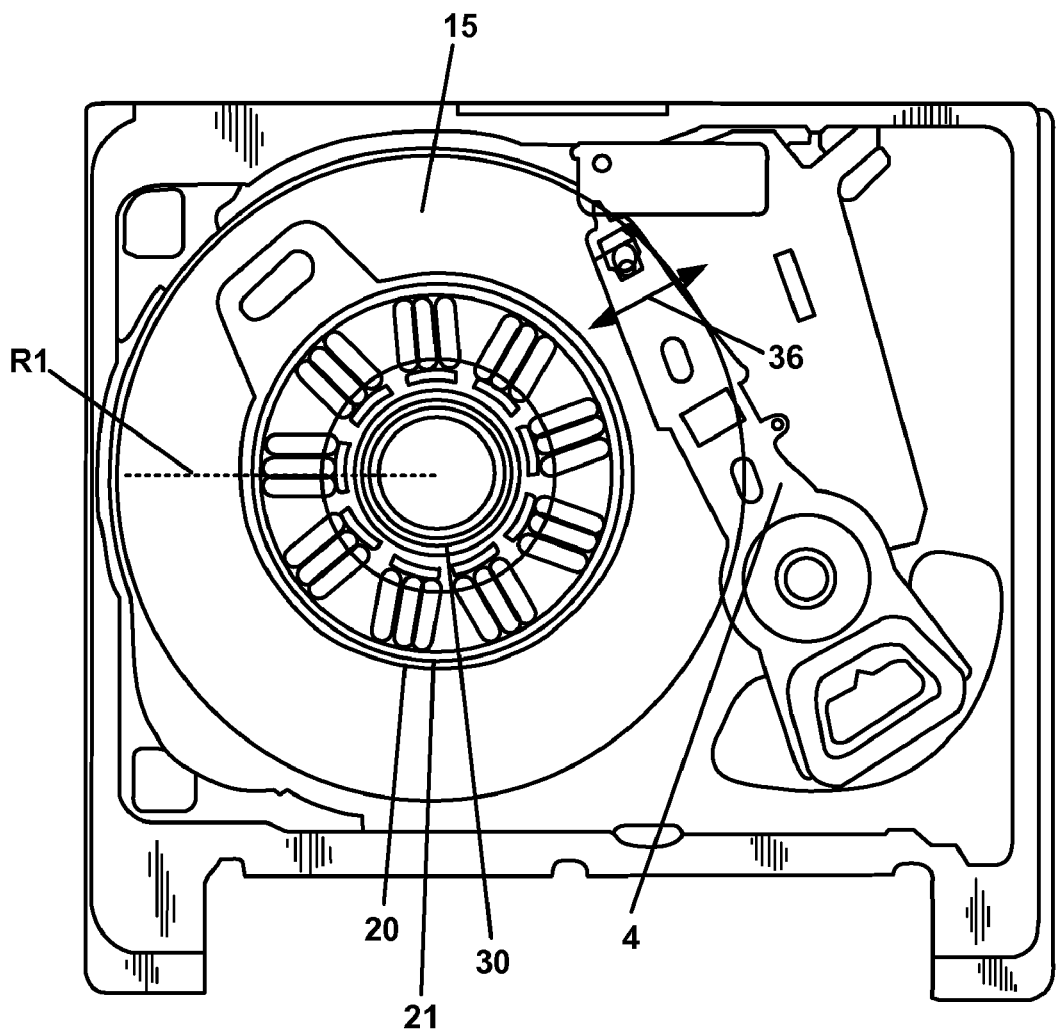
FIG. 5A (Prior Art) is an illustrated top view of a conventionally configured miniature hard disk drive shown with the spindle hub removed and only the disk perimeter defined.
Figure 5B:
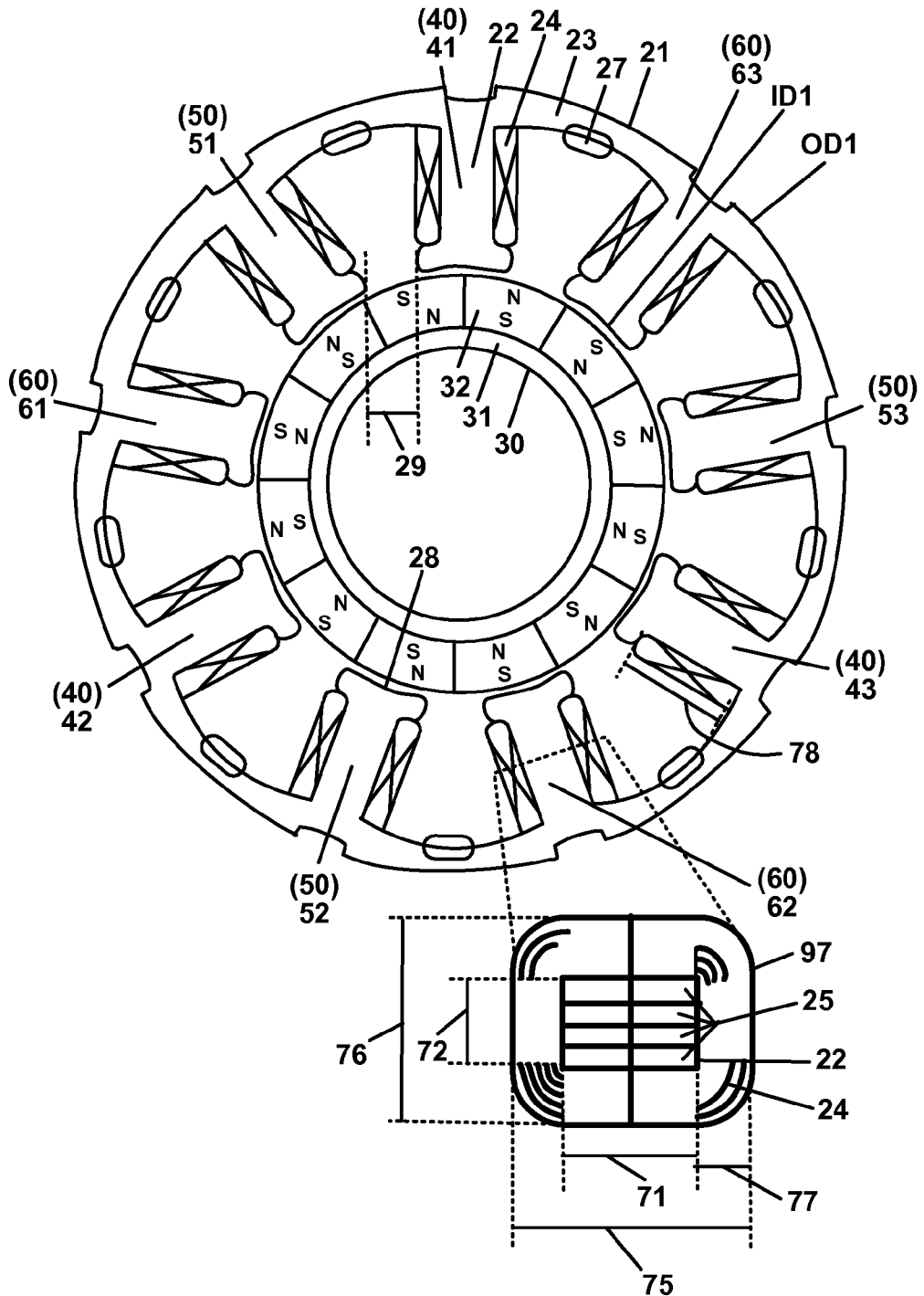
FIG. 5B (Prior Art) is an illustrated top view of a conventional stator and rotor portion, and the stator stem and coil cross-section shown removed from the base of the conventionally configured prior art hard disk drive of FIG. 5A.
Figure 5C:
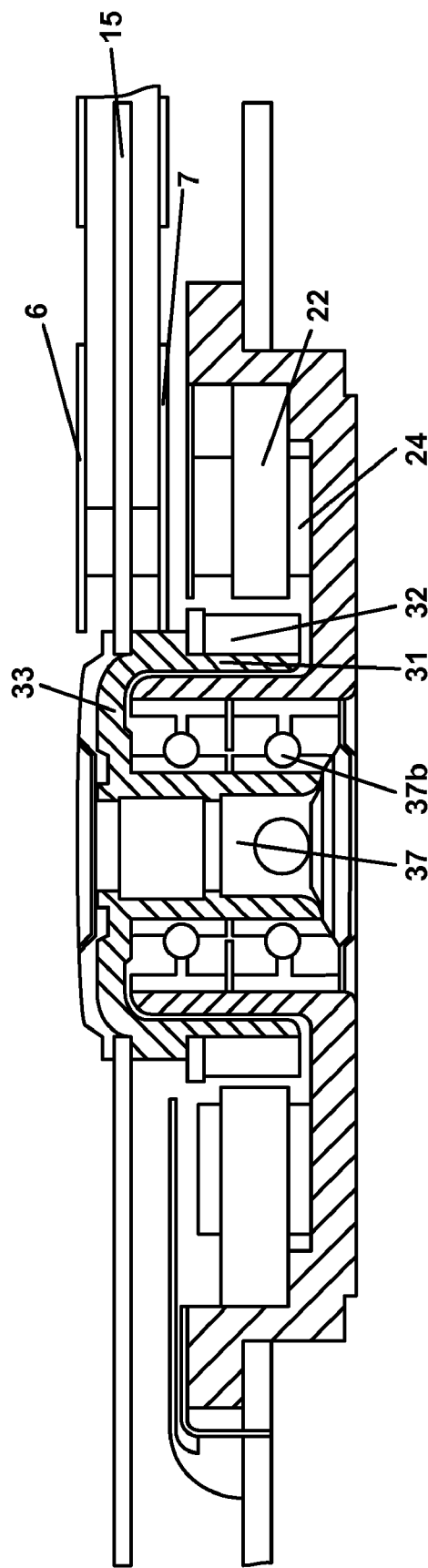
FIG. 5C (Prior Art) is a side elevation of the miniature hard disk drive of FIG. 5A.
Figure 5D:
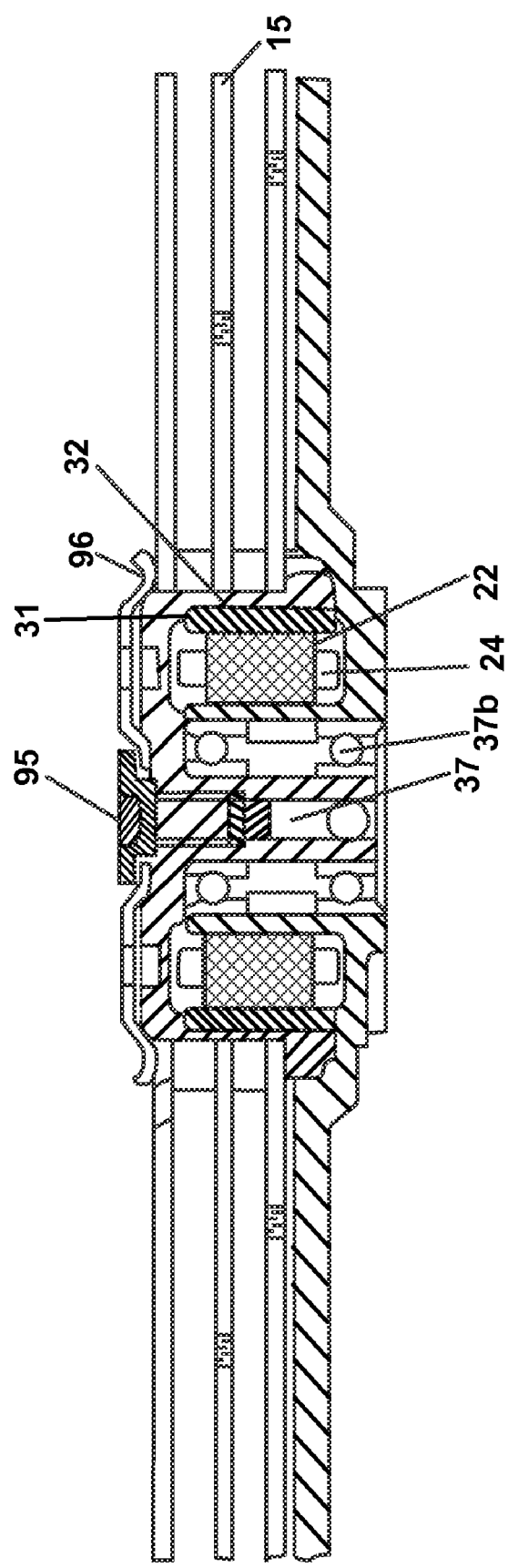
FIG. 5D (Prior Art) is an illustrated side elevation of a conventional in-hub spindle assembly for hard disk drives.
Figure 5E:
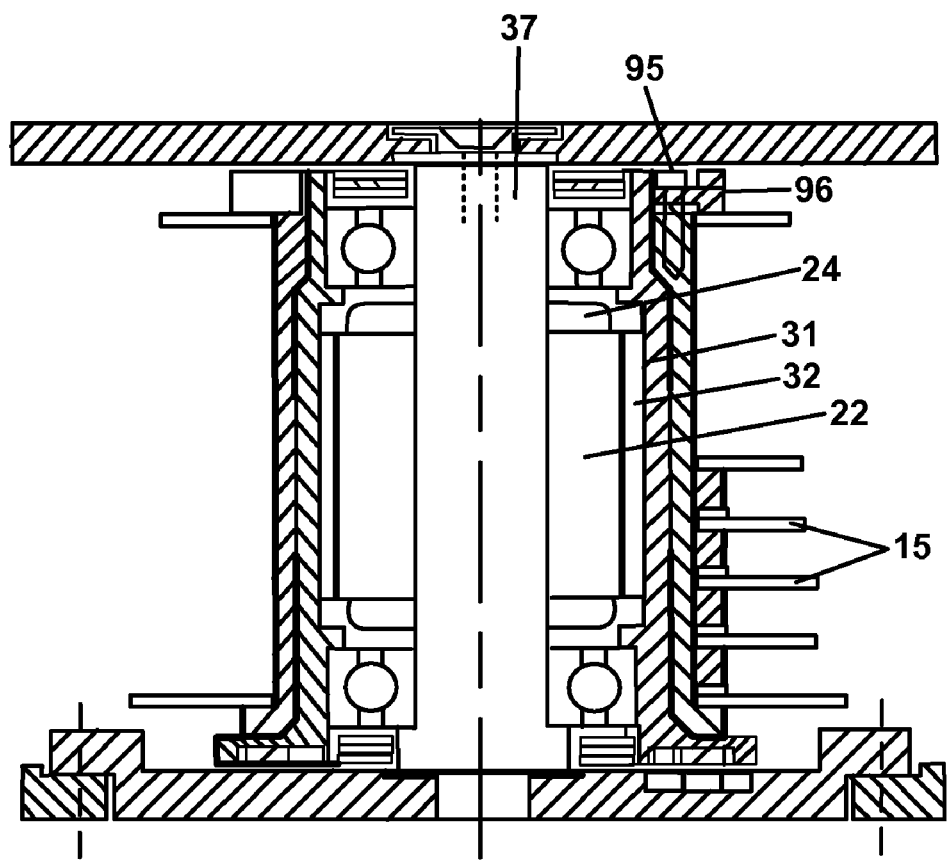
FIG. 5E (Prior Art) is an illustrated side elevation of another conventional in-hub spindle motor assembly for hard disk drives.

FIG. 2E and FIG. 2F are shown side-by-side for purposes of comparison. FIG. 2E (left) is an analogous illustration of stator stem cross-section 297 of FIG. 2C, including a stator stem 222 and a winding 224 wound thereon. FIG. 2F (right) is an analogous illustration of stator stem cross-section 97 of FIG. 5B, including a stator stem 22 and a winding 24 wound thereon.

Stator stem cross-section 297 of FIG. 2E (left side) is shown to have a stem height 272 approximating 1.0 millimeters and a stem width 271 approximating 0.9 millimeters, providing a stator stem area of approximately 0.9 square millimeters as measured without the insulating coating. This area is sufficient to carry the flux from the poles of the rotor magnets. A winding 224 around the stator stem in cross section 297 can be comprised of 0.068 millimeter copper wire and being wound in four layers, in an embodiment of the present invention. Coil winding 224 dimensions 276 and 275 are larger than the stator stem dimensions, including the insulation coating, by 0.28 millimeters per stem side to a maximum of 0.36 millimeters per stem side, shown as dimension 277. Accordingly, in the present embodiment, the total height 276 of coil winding 224 can range from an approximate minimum of 1.67 millimeters to an approximate maximum of 1.83 millimeters. Additionally, in the present embodiment, the total width 275 of coil winding 224 can range from an approximate minimum of 1.51 millimeters to an approximate maximum of 1.67 millimeters. In the present embodiment, the number of turns for each individual coil winding is 72 turns, or 288 turns per phase. Further, the torque constant provided in conjunction with cross-section 297 is a minimum 2.9 Newton millimeters per ampere, achieving minimum desired torque constant.

Stator stem cross-section 97 of FIG. 2F (right side) of a nine slot stator having a 12 pole rotor is shown to have a stem height 72 approximating 0.8 millimeters and a stem width 71 approximating 1.3 millimeters without the insulation coating, providing a stem cross-sectional area of approximately 1.04 square millimeters. This area is sufficient to carry the flux from the 12 poles of the rotor magnet. Wound around each stem stator 22 is a winding 24 which typically includes six layers of 0.080 millimeter diameter wire. This results in approximately 118 turns per stem equating to 354 turns per phase, and results in a total coil height 76 ranging from approximately 1.88 millimeters to approximately 2.06 millimeters, and a total coil width 75 ranging from approximately 2.33 millimeters to approximately 2.51 millimeters for a wound stem 22. The resulting high resistance phase to phase winding, in co-operation with the magnetic flux from the rotor magnet poles, creates a motor torque constant of approximately 2.9 Newton millimeters per ampere.

FIG. 3A is an illustrated top view of a spindle motor 300 having removed therefrom a rotor hub portion 233, in another embodiment of the present invention. Inner rotor assembly 230 analogous to inner rotor assembly 230 of FIG. 2A-2D and in which are shown a back iron 231 and rotor magnet 232 and which herein is incorporated by reference. Shown in this embodiment, stator assembly 310 of spindle motor 300 of FIG. 3A is similar to stator assembly 210 of spindle motor 200 of FIGS. 2A-2E. In this embodiment, stator assembly 310 is comprised of a plurality of stator stems 322, around each of which is a winding 324. It is particularly noted that in the present embodiment, particular stator stems 322, e.g., stems 342, 352, 362, 344, 354 and 364 are comprised of windings 324 that differ from windings 324 wound on other stator stems 322, e.g., 341, 351, 361, 343, 353 and 363.

Stator assembly 310 also has a three phase coil winding with phases 340, 350 and 360, respectively. Phase 340 is comprised of wound radially projected stems 341, 342, 343 and 344. Phase 350 is comprised of radially wound radially projecting stems 351, 352, 353 and 354. Phase 360 is comprised of wound radially projecting stems 361, 362, 363 and 364.

It is particularly noted that stator stems 341, 351, 361, 343, 353 and 363 are shown to have windings 324 that are different from stator stems 342, 352, 362, 344, 354 and 364. The stator stems associated with a first stage of each phase, e.g., stems 341, 351 and 361, and the stator stems associated with a third stage of each phase, e.g., stems 343, 353 and 363, can be comprised of analogous coil windings 324b disposed there around that are different from the analogous coil windings 324a of the stator stems associated with a second stage of each phase, e.g., stator stems 342, 352 and 362, and the stator stems associated with a fourth stage of each phase, e.g., stems 344, 354, and 364.

In operation, actuator 104 rotates about pivot assembly 103 to move suspension 106 (107) such that read/write head and slider 108 (109) is positioned over no more than one set or stage of stator stems 322 that are disposed beneath disk 115, e.g., stator stems 344, 354 and 364; and therefore the most severe coil height constraint is for only these stems. Importantly it is particularly noted that because stator assembly 310 is comprised of twelve stator stems 322, with each stem radially disposed and circumferentially 180 degrees opposite from one another, particular stator stems and their associated opposites can have a winding 324 differing from those stator stems radially disposed and circumferentially oriented plus or minus 90 and 270 degrees; and still proper radial force and torque force symmetry is retained about the spindle rotational axis. It is noted that regardless of the coil configuration of stator stems oriented plus or minus 90 or 270 degrees, stator stems that are 180 degrees from one another are always analogously configured.

In an embodiment of the present invention, when spindle motor 300 is implemented therein, the motor torque constant can be based on those stator stems configured for orientation beneath suspension 106 (107) of actuator arms 104 (105) of drive 111, e.g., coil winding 324a, having fewer winding turns than the stator stems oriented 90 or 270 degrees there from that can have more winding turns 324, e.g., coil winding 324b. This is because the stator shield imposes more height constraint on the 324a coils configured beneath the suspension traversing region, and less height constraint on the 324b coils in the non-actuator region.

Continuing with reference to FIG. 3A, shown is an illustration of the area dimension of a stator stem/coil cross-section 397a, representative of stator stem 354 having a coil winding 324a. Coil winding 324a around stator stems 342, 352, 362, 344, and 364 of stator 320 are analogous, in an embodiment of the present invention. Also shown is a stator stem cross-section 397b, representative of a stator stem 353 having a coil winding 324b. Coil winding 324b around stator stems 341, 351, 361, 343 and 363 of stator 320 are analogous.

Stator stem cross section 397a includes a stator stem height 272, a stator stem width 271, and a coil winding 324a. In an embodiment of the present invention, cross section 397a of stator stem 354 and cross section 397b of stator stem 353 both have a height 272 of approximately 1.0 millimeters and width 271 of approximately 0.9 millimeters, providing a stator stem area dimension of 0.9 square millimeters which is sufficient to carry the magnetic flux from the 16 pole rotor. It is noted that in alternative embodiments, the dimensions of height 272 and width 271 may be smaller or larger that those dimensions described, and as such dimensions described herein should construed as exemplary and not a limitation.

Continuing, when the coil wire is wound around a stator stem, the dimensions of a coil are directly affected depending on the number of turn layers for each coil. A winding 324 can be composed of from two to six layers of winding turns. Alternatively, a greater number of winding turn layers may be used in a coil winding.

In an embodiment of the present invention, and having 288 turns per phase to achieve a motor torque constant of 2.9 Newton millimeters per ampere, coil windings 324b could have 108 turns disposed in six layers; and coil windings 324a could have 36 turns disposed in two layers. For a wire diameter of 0.068 mm, coil height 324a would be approximately 1.4 mm and coil height 324b would be 1.94 to 2.1 millimeters. For those six coils 324b having a high profile, circular recess area 156 in the base directly under these six coils may need a slot(s) or hole(s) so as not to interfere with this side of the coils 324b.

In another embodiment of the present invention, the coil windings can be comprised of a wire having a diameter of approximately 0.072 millimeters, with 68 turns disposed in a four layer coil 324a, and on the order of 100 turns for the six layer coils 324b equating to 336 turns per phase. Coil height 324a can range from 1.7 to 1.87 millimeters, and coil height 324b from 1.98 to 2.15 millimeters. At a 15.6 mm outside diameter stator, the motor torque constant could be greater than 2.9 Newton millimeters per ampere for this number of turns. Therefore in yet another alternative embodiment with the same number of coil turns, the 2.9 Newton millimeter per ampere torque constant could be achieved with a stator having an outside diameter on the order of 15.0 millimeters with the inside diameter moved into 9.7 millimeters Advantageously, it is particularly noted that each of the above described coil windings provide a torque constant that generates the desired minimum, 2.9 Newton millimeters per ampere, thus providing for a low profile hard disk drive the proper torque and rotation speed for realizing optimum performance.

FIG. 3B is an illustrated side elevation view of a disk drive 111 having a spindle motor 300 of FIG. 3A implemented therein. The elevation view of FIG. 3B is similar to the elevation view of FIG. 2D, with some differences. Particularly, clearance space 184 is smaller than clearance space 185 because space 185 provides adequate clearance for the positioning of suspension 107 of actuator arm 105 (not shown) beneath disk 115. By virtue of the HGA shown disposed in the right side of the spindle axis of drive 111 in FIG. 2A, suspension 107 and actuator arm 105 are also located on the right side of FIG. 3B. Thus, elevated portion 188 of stator shield 186 can be oriented over most of the wound stems of the stator assembly 310 as shown toward the left side of the spindle axis, and planar portion 189 of stator shield 186 can be oriented below suspension 107 of actuator 105.

In the present embodiment, spindle motor 300 is shown to have a 12 slot stator in combination with a rotor of 16 poles, the configuration provides additional space which can be utilized for additional winding turns to be wound on those stator stems 90 and 270 degrees from those stator stems oriented under the HGA, e.g., stator stems 344, 354 and 364. Accordingly, stator stems oriented 90 or 270 degrees from those stator stems oriented under the HGA can have increased winding turns.

Figure 4A:
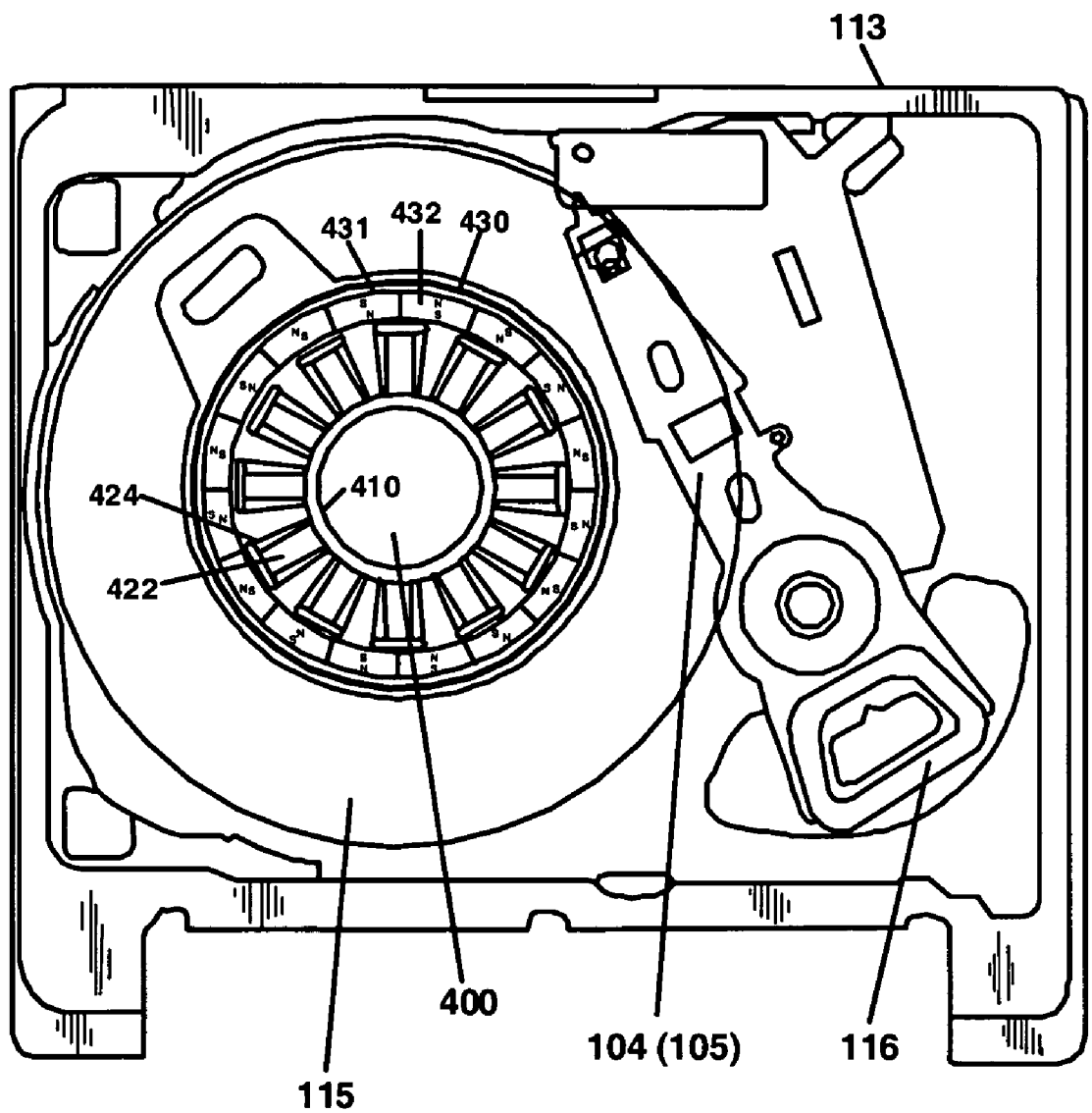
FIG. 4A is an illustrated top view of an alternative spindle motor implemented in a diminutively sized hard disk drive, in another embodiment of the present invention, shown with the spindle hub removed and only the outside diameter of the disk defined.

FIG. 4A is a top view of the stator and rotor assembly components of spindle motor 400 implemented in a low profile hard disk drive 111, shown with just the perimeter outline of the disk, and all the key spindle components removed except the rotor assembly and stationary stator assembly, in another embodiment of the present invention. Shown in FIG. 4A are housing 113, an actuator 104 (105), a voice coil motor assembly 116 for causing rotation of actuator 104 (105) about disk 115 and from which data can be stored, accessed, and otherwise manipulated by head slider 108 (109) as shown in FIG. 1A. Continuing, coil motor 116 rotates actuator arms 104 (105) such that heads 108 (109) are oriented over/(under) the section of disk 115 having data to be read, manipulated and/or stored thereon.

Spindle motor 400 is comprised of an inner stator assembly 410 and an outer rotor assembly 430. In an embodiment of the present invention, spindle motor 400 is comprised, in part, of inside stator assembly 410 having twelve stator stems 422 each having a coil winding 424 wound thereon. Spindle motor 400 is further comprised of an outside rotor assembly 430 having sixteen radially disposed magnetic poles 432. In another embodiment, inside stator 410 may be comprised of fifteen stems 422 and outside rotor 430 may be comprised of twenty magnet poles 432.

Figure 4B:
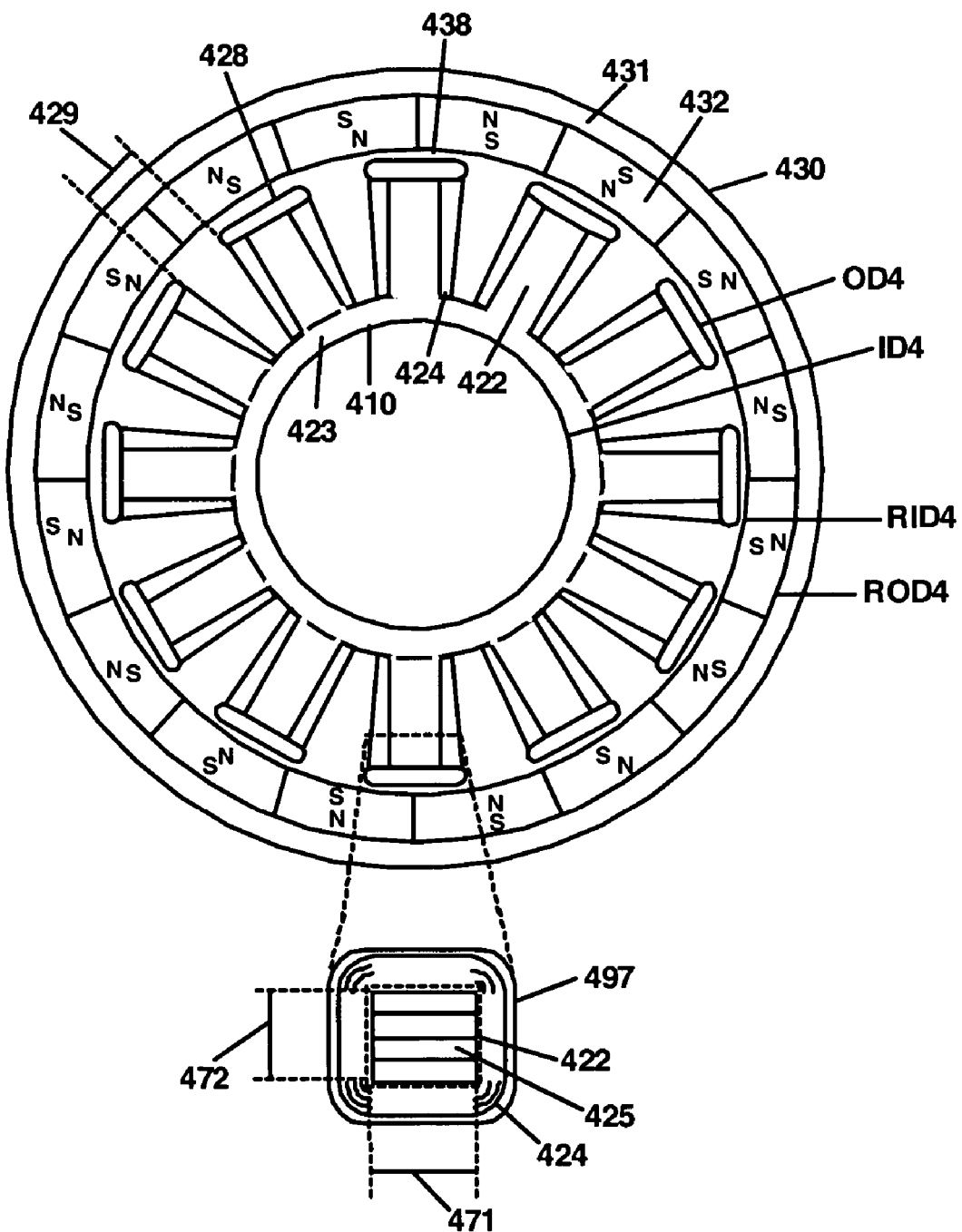
FIG. 4B is an illustrated top view of the stator coil unit and outside rotor shown removed from the hard disk drive base of FIG. 4A and an orthogonal cross-section of the stator stem and coil, in an embodiment of the present invention.

FIG. 4B is a top view wherein just stator assembly 410 and rotor assembly 430 of spindle motor 400 of FIG. 4A are shown removed from the MHHD. Inside stator assembly 410, in an embodiment of the present invention, has 12 slots or stems, and is comprised of three coil phases, phases 440, 450 and 460, respectively, in which each phase and stator stem is numbered similarly to the coil phases and stems shown in FIGS. 2B and 3A. Coil phase 440 is wound on radially projecting stems 441, 442, 443, and 444. Coil phase 450 is wound on radially projecting stems 451, 452, 453, and 454. Coil phase 460 is wound on radially projecting stems 461, 462, 463, and 464. Each stem 422 projecting from inner ring 423 terminates in a 'T' like shape having an arcuate shape or pole shoe 428 opposed and in close proximity with the magnetic poles 432 of the rotor assembly 430.

In an embodiment of the present invention, well-known techniques may be implemented in the fabrication of the stator as previously described for the outside configured stator.

Continuing with FIG. 4B, outer rotor assembly 430 is comprised of a plurality of radially disposed magnetic poles 432 wherein each magnet pole is comprised of a positive and negative side and wherein each magnet pole is oppositely oriented relative to a radially adjacent magnet pole. In an embodiment of the present invention, outer rotor assembly 430 can have sixteen poles 432. It is particularly noted that in an alternative embodiment, outer rotor 430 can be configured with a greater numbers of magnet poles 432 in a 4:3 ratio to the number of stems.

Within outside stator assembly 410, in an embodiment of the present invention, the coil windings 434 around each protruded stem 422 (e.g., stems 441, 442, 443, 444, 451, 452, 453, 454, 461, 462, 463, and 464) of each phase (e.g., phases 440, 450, and 450) are analogous in wire diameter size, and the number of windings that are disposed around each protruded spoke. In operation, inside stator assembly 410 has sets of stator stems 422 selectively energized that in co-operation with the magnetic flux from the rotor enables rotation of the spindle on its bearing axis.

Still referring to FIG. 4B, inner stator assembly is shown to have an outer diameter OD4 approximating 11.9 millimeters and an inner diameter ID4 approximating 5.90 millimeters, and a stator/rotor radial gap 438 approximating 0.15 millimeters. Radial gap 438 is the distance between the outer diameter OD4 of a stator stem shoe tip 428 of inner stator 410 and the inner diameter RID4 of outer rotor assembly 430 and from which generated torque flux is defined. In another embodiment of the present invention, stator 410 can have an outer diameter OD4 approximating 11.9 millimeters and an inner diameter ID4 of 5.75 millimeters.

Continuing, stator assembly 410 is also shown to include a winding opening 429 for providing space through which the coil can be wound around each stator stem 422. By virtue of the diminutive size of stator 410, it is critical to fabricate a stator stem that provides sufficient space for proper winding of the coil. In an embodiment of the present invention, the size of winding opening 429 can be approximately 1.24 millimeters for the winding needle, and during application of the winding, the needle space can be reduced significantly for those coil turns at the most inner diameter.

Still referring to FIG. 4B, shown is stator stem cross section 497 of a stator stem 422 (e.g., stator stems 441, 442, 443, 444, 451, 452, 453, 454, 461, 462, 463, and 464) of stator 410, in an embodiment of the present invention. Stator stem cross section 497 includes a stator stem 422 having a plurality of laminations 425, a stator stem height 472, a stator stem width 471, and a coil winding 424. In an embodiment of the present invention, stator stem height 472 is approximately 0.8 millimeters and stator stem width 471 is approximately 1.0 millimeter, providing a stator stem area dimension of 0.8 square millimeters. Alternatively, embodiments of the present invention are well suited to provide a stator stem area dimension that may be larger or smaller than the area dimensions described herein and, as such, dimensions described herein should construed as exemplary and not a limitation.

In an embodiment of the present invention, a coil winding 424 can be composed of from two to four layers of winding turns. Alternatively, a greater or lesser number of winding turns and turn layers may be used in a coil winding 424. It is noted that the wire used in a winding 424 can have a diameter ranging from 0.072 millimeters to smaller than 0.063 millimeters.

In the present embodiment, coil winding 424 can be comprised of four layers of turns of a wire having a diameter of 0.063 millimeters, with 70 turns (280 turns per phase). In this embodiment, the coil winding 424 dimensions of cross section 497 can range from an approximate nominal height of 1.43 millimeters to an approximate maximum height of 1.58 millimeters. At the maximum coil height for any of the twelve coils there must be a finite clearance to the coils by the rotating rotor web that supports the rotor assembly 430 area. In this embodiment, winding 424 can provide a phase to phase resistance of 16.5 ohms.

Advantageously, it is particularly noted that the above-described coil winding 424 provides the desired minimum torque constant, and as such enables realization of optimum performance, proper torque, and desired rotational speed for a low profile hard disk drive.

Figure 4C:
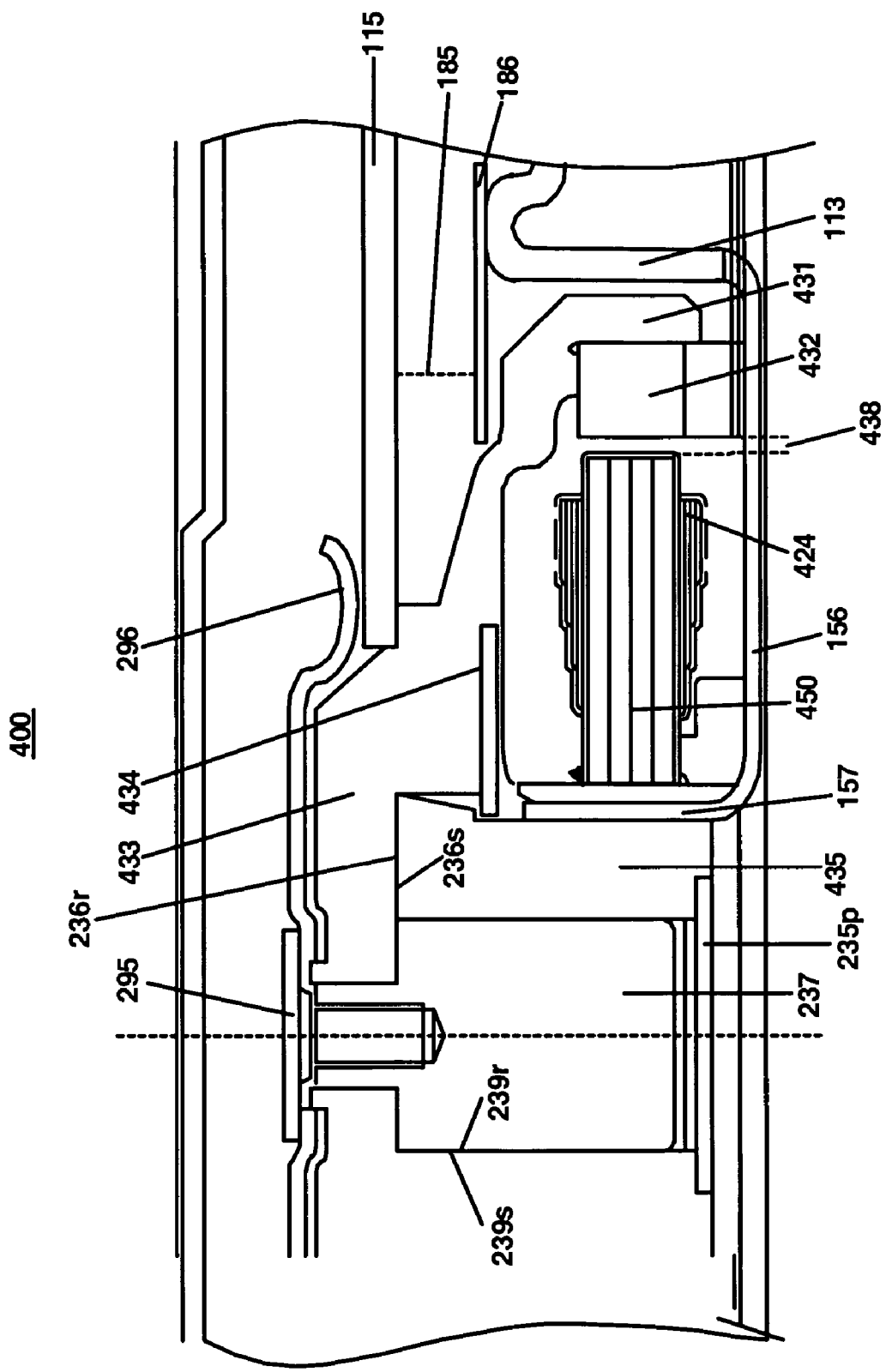
FIG. 4C is an illustrated side view elevation of a diminutively sized hard disk drive in which the stator/coil unit and rotor of FIG. 4A is implemented in an embodiment of the present invention.

FIG. 4C is a side elevation view of a low profile hard disk drive 111 in an embodiment of the present invention. Drive 111 is analogous to drive 111 of FIG. 4A and includes a spindle motor 400 comprised of a stator assembly 410 and a rotor assembly 430. Drive 111 also includes a rotor shield 186, as well as other spindle hub components previously described. If rotor hub 433 is of aluminum for an aluminum disk, at least that portion of the hub that supports the magnetic pole portion of the rotor, the back iron component, must be of a ferromagnetic material. Rotor assembly 430 can be comprised of sixteen radially mounted poles 432 in an embodiment of the present invention, wherein the axial height of magnetic rotor poles is approximately 1.02 millimeters.

Because outer rotor assembly 430 shown in FIGS. 4A-4D is configured as an outer rotor, and as such is subject to rotation, the necessary clearance 185 needed for the movement of suspension 106 (107) is still a critical design factor in a drive 111, with the head suspension 107 not contacting rotor shield 186 or the hub surface area beyond the inner diameter of this shield. Similarly rotor shield 186 must not contact any portion of the rotating hub.

Advantageously, embodiments of the present invention can provide a spindle motor that can provide for a constant torque value that provides the determined minimum torque specification for proper operation of a hard disk drive while reducing the overall volume needed for such torque constant.

What is claimed is:

1. A spindle motor for implementation in a low profile hard disk drive, said spindle motor comprising:
    a hub, having a rotational axis, to which a platter of said low profile hard disk drive is coupled, said hub coupled to a suitable bearing system;
    a stator portion configured to be coupled to said low profile hard disk drive, said stator portion having twelve stems and a plurality of windings, said plurality of windings providing conductivity for creating an electromagnetic force;
    a rotor portion coupled with said hub, said rotor portion having a permanent magnet radially polarized, said permanent magnet having sixteen poles, wherein the number of poles of said rotor portion has a defined proportion relative to the number of stems of said stator portion, said stator portion and said rotor portion are configured for disposition beneath said platter;
    a torque radius interposed between said stator portion and said rotor portion; and
    wherein a created electromagnetic force applied at said torque radius provides a torque to said rotor portion, said torque enabling rotation of said hub.

2. The spindle motor as recited in claim 1 wherein said stator portion is an outer stator and said rotor portion is an inner rotor.

3. The spindle motor as recited in claim 1 wherein said plurality of windings provide a three phase stator portion wherein each phase of said three phase stator portion is comprised of four stems, wherein each fourth stem of each said phase is oriented circumferentially opposite each second stem of each said phase and wherein each said second stem retains direct opposite radial symmetry relative to each said fourth stem of each said phase.

4. The spindle motor as recited in claim 1 further comprising:
    a torque constant greater than a defined threshold and having a diametrical physical dimension less than a defined maximum.

5. The spindle motor as recited in claim 1 wherein said suitable bearing system is a bearing system selectable from the group of bearing systems essentially consisting of:
    a rotating shaft fluid bearing system, a fixed shaft fluid bearing system, a rotating shaft ball bearing system, and a fixed shaft ball bearing system.

6. The spindle motor as recited in claim 1 further comprising
    a disk clamping system, said disk clamping system providing constraints on an axial load upon said platter.

7. A low profile disk drive for data storage comprising:
    a housing enclosing a clean chamber;
    a data storage disk disposed within said housing;
    a read/write head for each data storing surface of said data storage disk, said read/write head positionable within said clean chamber and for reading from and writing data to said data storage disk;
    a spindle motor for rotating said data storage disk, said spindle motor comprising:
        a hub, having a rotational axis, to which said data storage disk is coupled, said hub coupled to a suitable bearing system;
        a stator portion configured to be coupled to said low profile disk drive, said stator portion having twelve stems and a plurality of windings, said plurality of windings providing conductivity for creating an electromagnetic force;
        a rotor portion coupled with said hub, said rotor portion having a permanent magnet radially polarized, said permanent magnet having sixteen poles, wherein the number of poles of said rotor portion has a defined proportion relative to the number of stems of said stator portion, said stator portion and said rotor portion are configured for disposition beneath said data storage disk;
        a torque radius interposed between said stator portion and said rotor portion; and
        wherein a created electromagnetic force applied at said torque radius provides a torque to said rotor portion, said torque enabling rotation of said hub.

8. The low profile disk drive as recited in claim 7 wherein said stator portion is an outer stator and said rotor portion is an inner rotor.

9. The low profile disk drive as recited in claim 7 wherein said plurality of windings provide a three phase stator portion wherein each phase of said three phase stator portion is comprised of four stems, wherein each fourth stem of each said phase is oriented circumferentially opposite each second stem of each said phase and wherein each said second stem of each said phase retains direct opposite radial symmetry relative to each said fourth stem of each said phase.

10. The low profile disk drive as recited in claim 7 further comprising:
    a torque constant greater than a defined threshold and having a diametrical physical dimension less than a defined maximum.

11. The low profile disk drive as recited in claim 7 wherein said suitable bearing system is a bearing system selectable from the group of bearing systems essentially consisting of:
    a rotating shaft fluid bearing system, a fixed shaft fluid bearing system, a rotating shaft ball bearing system, and a fixed shaft ball bearing system.

12. The low profile disk drive as recited in claim 7 further comprising
    a disk clamping system, said disk clamping system providing constraints on an axial load upon said platter.

* * * * *